United States Patent [19]
Umeda

[11] Patent Number: 5,268,904
[45] Date of Patent: Dec. 7, 1993

[54] ISDN TERMINAL EQUIPMENT CONTROL METHOD

[75] Inventor: Toshihiko Umeda, Yokohama, Japan

[73] Assignee: Ricoh Company, Ltd., Tokyo, Japan

[21] Appl. No.: 874,126

[22] Filed: Apr. 24, 1992

[30] Foreign Application Priority Data

Apr. 24, 1991 [JP] Japan ................... 3-122357
Sep. 27, 1991 [JP] Japan ................... 3-274927
Nov. 15, 1991 [JP] Japan ................... 3-326806

[51] Int. Cl.$^5$ ................... H04J 3/12; H04J 3/24
[52] U.S. Cl. ................... 370/110.1; 370/94.1; 370/85.1; 340/825.5
[58] Field of Search ............ 370/94.1, 94.2, 85.1, 370/110.1, 60, 60.1; 340/825.5

[56] References Cited

U.S. PATENT DOCUMENTS

| | | | |
|---|---|---|---|
| 4,958,153 | 9/1990 | Murata et al. | 370/94.1 |
| 4,975,904 | 12/1990 | Mann et al. | 370/94.1 |
| 4,975,905 | 12/1990 | Mann et al. | 370/85.1 |
| 5,008,879 | 4/1991 | Fischer et al. | 370/94.1 |
| 5,127,003 | 6/1992 | Doll, Jr. et al. | 370/94.2 |

Primary Examiner—Douglas W. Olms
Assistant Examiner—Ajit Patel
Attorney, Agent, or Firm—Oblon, Spivak, McClelland, Maier & Neustadt

[57] ABSTRACT

In a method for controlling ISDN terminals connected to a passive bus conforming to an ISDN basic interface, the ISDN terminals being coupled to each other via a network, there are provided the following steps. A first step is to manage status of use of information channels in the passive bus by means of a communication server connected to the network. A second step is to send the communication server command data showing that the ISDN terminals will use the communication channels. A third step is to update management data showing the status of use of the information channels managed by the first step in response to receipt of the command data. A fourth step is to send updated management data showing the status of use of the information channels obtained after the command data is received to the ISDN terminals via the network.

15 Claims, 26 Drawing Sheets

| LSW | LT | NT | | | |
|---|---|---|---|---|---|
| 0 | 0 | 3 | 2 | 1 | 0 |
| | | 7 | 6 | 5 | 4 |
| | | 11 | 10 | 9 | 8 |
| | | 15 | 14 | 13 | 12 |
| | 1 | 3 | 2 | 1 | 0 |
| | | 7 | 6 | 5 | 4 |
| | | 11 | 10 | 9 | 8 |
| | | 15 | 14 | 13 | 12 |
| | ⎰ | ⎰ | | | |
| | 15 | 3 | 2 | 1 | 0 |
| | | 7 | 6 | 5 | 4 |
| | | 11 | 10 | 9 | 8 |
| | | 15 | 14 | 13 | 12 |

FIG.4

| CALLED SUB ADDRESS |
| CALLING SUB ADDRESS |
| COMMAND ID |
| DEVICE # |
| CHANNEL INFORMATION |
| LOGGING GENERATED TIME INFORMATION |
| CALL-IN # |
| CALL-OUT # |
| CALL STATE # |
| REASON DISPLAY INFORMATION |
| BAS CAPABILITY/COMMAND |
| TRANSMISSION PATH QUALITY |

FIG.5

| VALUE(H) | CONTENTS OF COMMAND |
|---|---|
| 00 | LOGGING |
| 01 | LOGGING/CHANNEL STATUS REQUEST |
| 02 | TRANSFER REQUEST |
| 03 | TRANSFER CONFIRMATION |
| 04 | TRANSFER CANCELLATION |
| 05 | IN-USE DISPLAY |
| 07 | NETWORK JOINT |
| 11 | LOGGING (H.242) |
| 12 | CAPABILITY BAS NOTIFICATION |
| 13 | COMMAND BAS NOTIFICATION |
| 14 | TRANSMISSION PATH QUALITY NOTIFICATION |
| 15 | CHANNEL STATUS NOTIFICATION |
| 17 | CIPHER KEY NOTIFICATION |
| 24 | TRANSMISSION PATH QUALITY NOTIFICATION |
| 25 | CHANNEL STATUS REQUEST |
| 27 | CIPHER KEY REQUEST |
| 31 | CHANNEL STATUS SETTING REQUEST |

FIG.8

(OCTET)

| (FRAME) | | 1 | 2 | 3 | 4 | 5 | 6 | 7 | 8 |
|---|---|---|---|---|---|---|---|---|---|
| | 0 | N1 | 0 | 0 | 1 | 1 | 0 | 1 | 1 |
| | 1 | 0 | 1 | A | E | C1 | C2 | C3 | C4 |
| | 2 | N2 | 0 | 0 | 1 | 1 | 0 | 1 | 1 |
| | 3 | 0 | 1 | A | E | C1 | C2 | C3 | C4 |
| | 4 | N3 | 0 | 0 | 1 | 1 | 0 | 1 | 1 |
| | 5 | 1 | 1 | A | E | C1 | C2 | C3 | C4 |
| | 6 | N4 | 0 | 0 | 1 | 1 | 0 | 1 | 1 |
| | 7 | 0 | 1 | A | E | C1 | C2 | C3 | C4 |
| | 8 | N5 | 0 | 0 | 1 | 1 | 0 | 1 | 1 |
| | 9 | 1 | 1 | A | E | C1 | C2 | C3 | C4 |
| | 10 | R1 | 0 | 0 | 1 | 1 | 0 | 1 | 1 |
| | 11 | 1 | 1 | A | E | C1 | C2 | C3 | C4 |
| | 12 | R2 | 0 | 0 | 1 | 1 | 0 | 1 | 1 |
| | 13 | R3 | 1 | A | E | C1 | C2 | C3 | C4 |
| | 14 | TEA | 0 | 0 | 1 | 1 | 0 | 1 | 1 |
| | 15 | R4 | 1 | A | E | C1 | C2 | C3 | C4 |

FIG.12A

| PROTOCOL IDENTIFIER |
|---|
| CALL NUMBER |
| MESSAGE TYPE |
| ESSENTIAL INFORMATION ELEMENT |
| ADDITIONAL INFORMATION ELEMENT |

FIG.12B

| TRANSFER CAPABILITY |
|---|
| CALLING NUMBER |
| CALLED NUMBER |
| LOW LAYER COMPATIBILITY |
| HIGH LAYER COMPATIBILITY |
| USER · USER |

FIG.21

| CALL STATE VALUE | STATE |
|---|---|
| 0 | IDLE |
| 1 | CALL OUT |
| 2 | DIVISIONAL CALL |
| 3 | CALL OUT ACCEPTANCE |
| 4 | RINGING NOTIFICATION |
| 6 | CALL IN |
| 7 | RINGING |
| 8 | RESPONSE |
| 9 | CALL-IN ACCEPTANCE |
| 10 | IN COMMUNICATION |
| 11 | DISCONNECT REQUEST |
| 12 | DISCONNECT NOTIFICATION |
| 15 | INTERRUPT REQUEST |
| 17 | RESTART REQUEST |
| 19 | RELEASE REQUEST |
| 25 | DIVISIONAL CALL IN |

ISDN TERMINAL EQUIPMENT CONTROL METHOD

BACKGROUND OF THE INVENTION

1. Field of the Invention

The present invention generally relates to ISDN (Integrated Services Digital Network, and more particularly to a method of controlling ISDN terminal equipments, such as audio/visual terminal equipments or audio terminal equipments using the ISDN as a transmission path, connected to a passive bus of an ISDN basic interface.

2. Description of the Prior Art

The types of data transmittable via an ISDN being built at present are audio data, dynamic image data, still image data and general-purpose data. Recently, multimedia terminals capable of transmitting a plurality types of data have been in practical use.

Now, the CCITT is preparing for the provision of recommendations regarding audio/visual terminals capable of handling audio data and dynamic image data, such as video phone and television conference systems. In Japan, the TTC has made the national recommendations based on the recommendations of the CCITT.

Basically, the audio/visual terminal uses one or two information channels (B channels) having a bit rate of 64 Kbps, and dynamically uses secured B channels in order to transfer audio data having bit rates of 16, 48, 56 and 64 Kbps and dynamic image data having bit rates of 46.2, 62.4, 68.8, 76.8, 102.4 and 108.8 Kbps or other bit rates. The audio data and the dynamic image data can be transmitted so that they are combined with each other, or separately from each other. It will be noted that encoding of audio and dynamic image data using a transmission capacity of 128 Kbps can provide quality higher than that using a transmission capacity of 64 Kbps.

According to the ISDN basic interface, two information channels for use in data transmission and one signal channel (D channel; 16 Kbps) for use in transfer of signals for call setup and low-bit rate packet data communications are multiplexed with each other. Connection points (S/T points) of the ISDN basic interface can be connected to a passive bus. The passive bus has a capacity such that 32 sockets (consents) can be connected thereto, and eight terminal equipments which are maintained in the transmittable state can be connected to the passive bus at most. Thus, by using the passive bus, it is possible to separately and independently use audio/visual terminals (video phones, for example) and other ISDN terminals, such as telephone terminals.

However, the above separate and independent use of audio/visual terminals and other ISDN terminals connected to a single passive bus has the following disadvantages. When data is transferred between video phones in a state where a telephone set connected to a passive bus to which the other party video phone is connected is busy, one information channel is available between the video phones. In the above case, another video phone can be used for communication. During this communication, audio information is encoded in a band of 3.4 kHz and a bit rate of 16 Kbps is allotted thereto. Further, dynamic image data is encoded in accordance with a QCIF (image format described in the TTC Recommendation JT-H.242). Regarding the dynamic image data, the MPI of a screen interval is set to approximately 29.97/2, and a bit rate of 76.8 Kbps is allotted, so that the sum total of these rates becomes equal to 124.8 Kbps. In the above-mentioned manner, a high-quality communication mode can be obtained. However, it is impossible to identify a timing at which the second information channel is ensured unless the calling telephone terminal or the called telephone terminal can detect the end of speech. In this case, it is possible to shift to the high-quality communication mode.

According to the existing recommendations, there is no way except for a process by trial and error in order to determine whether or not the second information channel can be ensured. In the process by trial and error, an additional call setup operation must be carried out. Hence, there is a possibility that invalid calls in the ISDN may increase.

SUMMARY OF THE INVENTION

It is a general object of the present invention to provide an ISDN terminal equipment control method in which the above-mentioned disadvantages are eliminated.

A more specific object of the present invention is to provide an ISDN terminal equipment control method making it possible to obtain, at the ISDN terminal equipment, information showing the status of lines.

The above objects of the present invention are achieved by a method for controlling ISDN terminals connected to a passive bus conforming to an ISDN basic interface, said ISDN terminals being coupled to each other via a network, said method comprising the steps of:

a) managing status of use of information channels in the passive bus by means of a communication server connected to the network;

b) sending the communication server command data showing that the ISDN terminals will use the communication channels;

c) updating management data showing the status of use of the information channels managed by step a) in response to receipt of the command data; and d) sending updated management data showing the status of use of the information channels obtained after the command data is received to the ISDN terminals via the network.

BRIEF DESCRIPTION OF THE DRAWINGS

Other objects, features and advantages of the present invention will become more apparent from the following detailed description when read in conjunction with the accompanying drawings, in which:

FIG. 4 is a diagram showing a signal format of command data transferred via a local area network;

FIG. 5 is a diagram showing a relation between command identifying information and command type;

FIG. 8 is a diagram of a frame alignment signal;

FIG. 12 is a diagram showing a signal format of a call setup signal;

FIG. 21 is a diagram showing a relation between a call state number and a call state;

DESCRIPTION OF THE PREFERRED EMBODIMENTS

Figure 1:
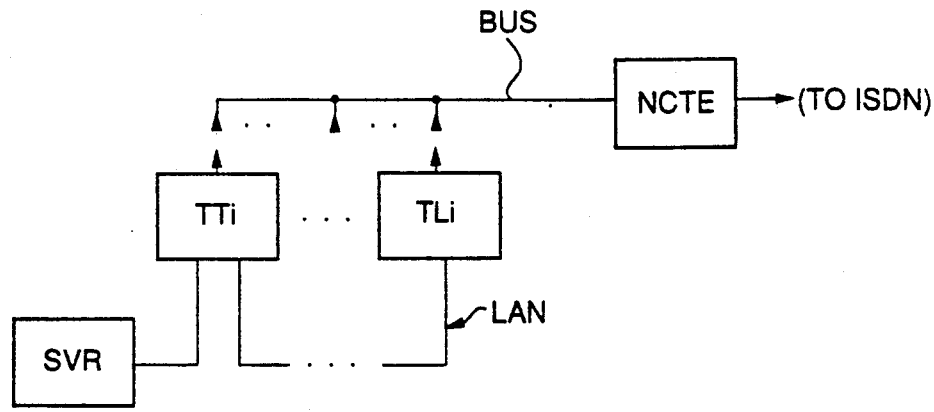
FIG. 1 is a block diagram of a communication system according to a first embodiment of the present invention.

FIG. 1 shows a communication system according to an embodiment of the present invention. Referring to FIG. 1, a four-wire type passive bus BUS is connected to a network control terminal NCTE connected to a basic interface with the ISDN. A video phone terminal TTi having the audio/visual terminal function prescribed in the TTC Recommendations JT-G.725 and JT-H.320, and a telephone terminal TLi having only a communication function are connected to the passive bus BUS. Generally, a maximum of 32 sockets (outlets) can be connected to the passive bus BUS. A maximum of eight terminal equipments which are in a transmittable state can be simultaneously connected to each of the sockets.

The communication system shown in FIG. 1 has a LAN (Local Area Network), which connects the video phone terminal TTi, the telephone terminal TLi and a communication server SVR together. The communication server SVR provides various services. An example of the services is to inform the video phone terminal TTi and the telephone terminal TLi of the status of use of two information channels available in the passive bus BUS.

The LAN can be formed of a known LAN which conforms to, for example, IEEE802.3, 802.3-1BASE5 or IEEE802.3-10BASE-T, the disclosure of which is hereby incorporated by reference.

Figure 2:
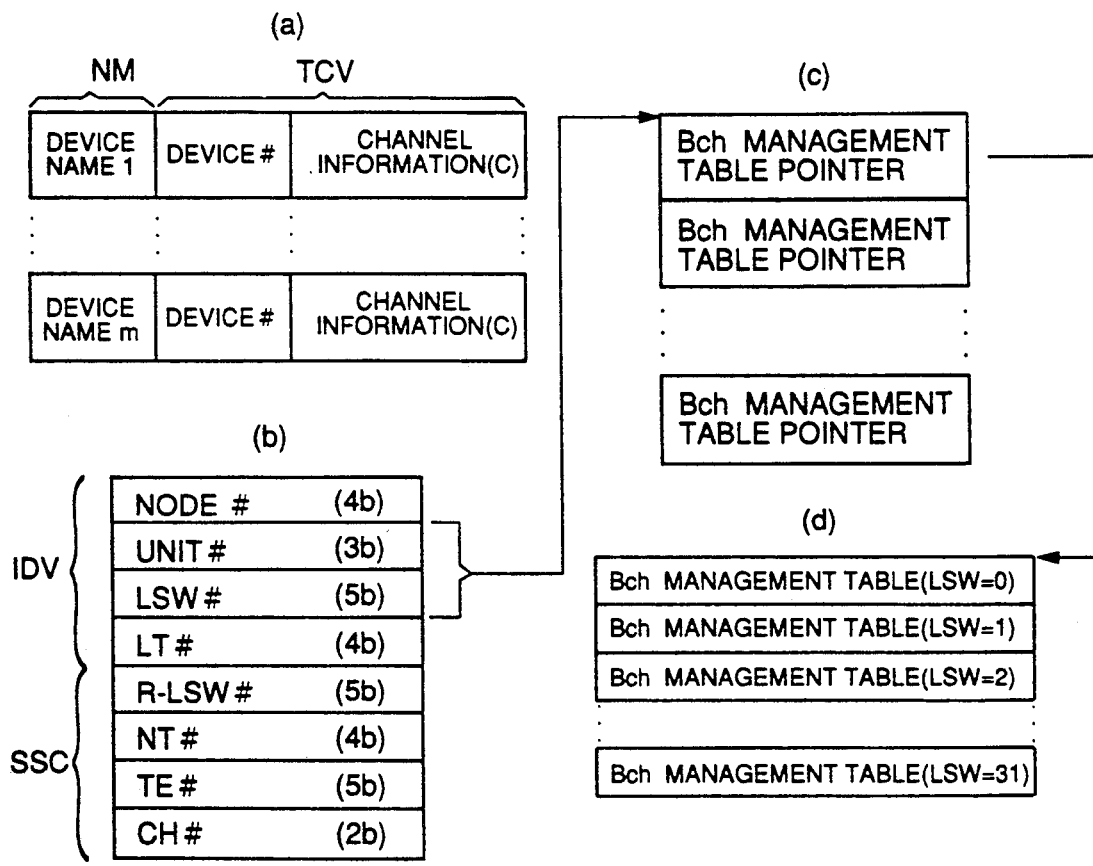
FIG. 2 is a diagram showing a device name/line information conversion table stored in a communication server shown in FIG. 1.

In order to manage the status of use of two information channels available in the passive bus BUS, the communication server SVR stores a device name/line information conversion table as shown in (a) and (b) of FIG. 2, an information channel management table pointer table as shown in (c) of FIG. 2, and a group of information channel management tables as shown in (d) of FIG. 2. The information managed using the above tables includes information concerning a private branch exchange so that the communication server SVR can be applied to a passive bus BUS connected to the private branch exchange.

The device name/line information conversion table includes a pair of devices name NM and conversion information TVC. The device name NM is used for identifying, on the LAN, the video phone terminal TTi and the telephone terminal TLi connected to the passive bus BUS. The conversion information TVC includes a device identification number IDV and channel information SSC. The device identification number IDV includes a node number, a unit number, an LSW number and an LT number. The node number and unit number are used for specifying the private branch exchange (which will be described in detail later) to which the passive bus BUS is connected. The LSW number shows a line concentration switch (LSW) to which the passive bus BUS is connected. The LT number shows a transmission line terminator (LT) to which the passive bus BUS is connected. The channel information SSC includes an R_LSW number, an NT number, a TE number and a CH number. The R_LSW number represents a remote line concentration switch (R_LSW) to which the passive bus BUS is connected. The NT number shows a network terminal equipment (NT) to which the passive bus BUS is connected. The TE number identifies terminal equipment in each passive bus BUS. The CH number specifies the information channel.

The information channel management table pointer as shown in (c) of FIG. 2 stores pointers respectively showing the beginning addresses of information channel management information tables with respect to specific information channels. The respective information channel table pointers are stored in addresses relating to the unit number and LSW number contained in the device number IDV contained in the conversion information TVC.

Figures 3A, 3B:
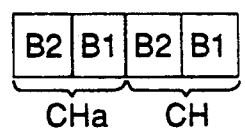
FIGS. 3A and 3B are diagrams showing information channel management information.

As shown in FIG. 3A, each information management table is formed in such a manner that 16 LT numbers are disposed with respect to one LSW number, and information channel management information is disposed in connection with each of 16 NT numbers for each of the LT numbers.

As shown in FIG. 3B, the information channel management information includes channel bits CH for storing information showing whether or not the B1 and B2 channels are respectively busy, and reserved channel bits CHa for storing information showing whether or not the B1 and B2 channels have been respectively reserved. In order to obtain information concerning the status of the information channels in the passive bus BUS to which a terminal is connected, the communication server SVR execute the following procedure.

First, the communication server SVR reads, from the device name/line information conversion table, the conversion information TVC relating to the device name NM of the terminal connected to the passive bus BUS being considered. Next, the unit number and the LSW number are read from the device identification number IDV contained in the readout conversion information TVC. Then, the communication server SVR reads the information channel table pointer stored in the address corresponding to the readout unit number and the LSW number. Thereafter, the communication server SVR searches for the information channel management table indicated by the read information channel management table pointer. Then the communication server SVR reads the information channel management information relating to the LT number and NT number contained in the channel information SSC.

FIG. 4 shows an example of a signal format of command data transferred, via the LAN, between among the communication server SVR, the video phone TTi and the telephone terminal TLi. Referring to FIG. 4, an information element "called party (destination) sub address" includes data showing the device name MN which is identifying information on the LAN set in equipment (terminal equipment and communication server SVR) which is the called party to which command data is transferred. An information element "calling party (source) sub address" includes identifying information (device name NM) on the LAN set in equipment which is the calling party which generates the command data. An information element "command identifying information (ID)" includes data showing the type of the command data.

An information element "device number" includes information corresponding to the aforementioned device number IDV. An information element "channel information" includes information corresponding to the aforementioned channel information SSC. An information element "logging generated time information" includes data showing the time when an event resulting in the command data takes place.

An information element "called number" includes the contents of a "called number" information element contained in a call setup message (which will be described later) received at the time of call setup which is executed or has been executed by the source party of the command data. An information element "calling number" includes a "calling number" information element contained in the above call setup message. An information element "call state number" includes a call state number, which shows a call status of the source party observed when the command data is sent. An information element "reason display information" includes the contents of a "reason display" information element displayed by the ISDN in a case where clearing/interrupting/restarting of a call takes place.

An information element "BAS capability/command" includes the value of a BAS capability/command which is set when data communication takes place between the calling party and the called party in a frame mode (which will be described in detail later). An information element "transmission path quality" includes transmission path quality data calculated on the basis of frame data transferred in the frame mode.

A hexadecimal number consisting of two digits is set in the command identifying information. FIG. 5 shows the relation between the hexadecimal numbers and the types of command.

Data 00h (h denotes a hexadecimal number) denotes a "logging" command, which requests the communication server SVR to save a variety of information. Data 01h denotes a "logging and channel status request" command, which requests the communication server SVR to execute a logging operation to inform the terminal which generates this command of the status of use of the passive bus BUS to which said terminal is connected. Data 02h denotes a "transfer request" command, which requests to transfer the set-up call to another terminal equipment. Data 03h denotes a "transfer confirmation" command to display an affirmative response to the "transfer request" command. Data 04h denotes a "transfer cancellation" command to inform the transfer destination party of cancellation of transfer of the call because there is no response from the transfer destination party.

Data 05h denotes an "in-use display" command, which informs the communication server SVR that the terminal which generates this command is using the information channel. Data 07h denotes a "network joint" command, which informs the communication server SVR, from the private branch exchange, of the status of use of the information channel in a case where the above private branch exchange is also connected to the LAN (such a case will be described in detail later).

Data 11h denotes a "logging(H.242)" command, which requests the communication server SVR to save information concerning the TTC recommendation JT-H.242 (transmission control of audio/visual terminals), the disclosure of which is hereby incorporated. Data 12h denotes a "capability BUS notification" command, which informs the communication server SVR of the capability BAS transferred between the calling terminal and the called terminal. Data 13h denotes a "command BAS notification" command, which informs the communication server SVR of a command BUS received from the other party. Data 14h denotes a "transmission path quality notification" command, which informs the communication server SVR of the quality of a transmission path forming the information channel which is being used for transferring data.

Data 15h denotes a "channel status notification" command, which informs the terminal equipment of the status of use of the information channel in the passive bus BUS to which the above terminal equipment is connected. Data 17h denotes a "cipher key notification" command, which informs the terminal equipment of a cipher key used in data communications. Data 24h denotes a "transmission path quality request" command, which requests the terminal equipment to transmit transmission path quality data. Data 27h denotes a "cipher key request" command, which requests the communication server SVR to the cipher key used. Data 31h denotes a "channel status setting request" command, which instructs the communication server SVR to execute a rewriting operation in a case where terminal equipment is at a deadlock and there is a need to rewrite information channel management information stored, as "in use", in the communication server SVR by another terminal equipment connected to the passive bus BUS to which the communication equipment at deadlock is connected in order to continuously provide communication services.

In the B channel, the video phone terminal TTi sends and receive data in a multiframe format prescribed in the TTC recommendation JT-H.221, the disclosure of which is hereby incorporated.

Figure 6:
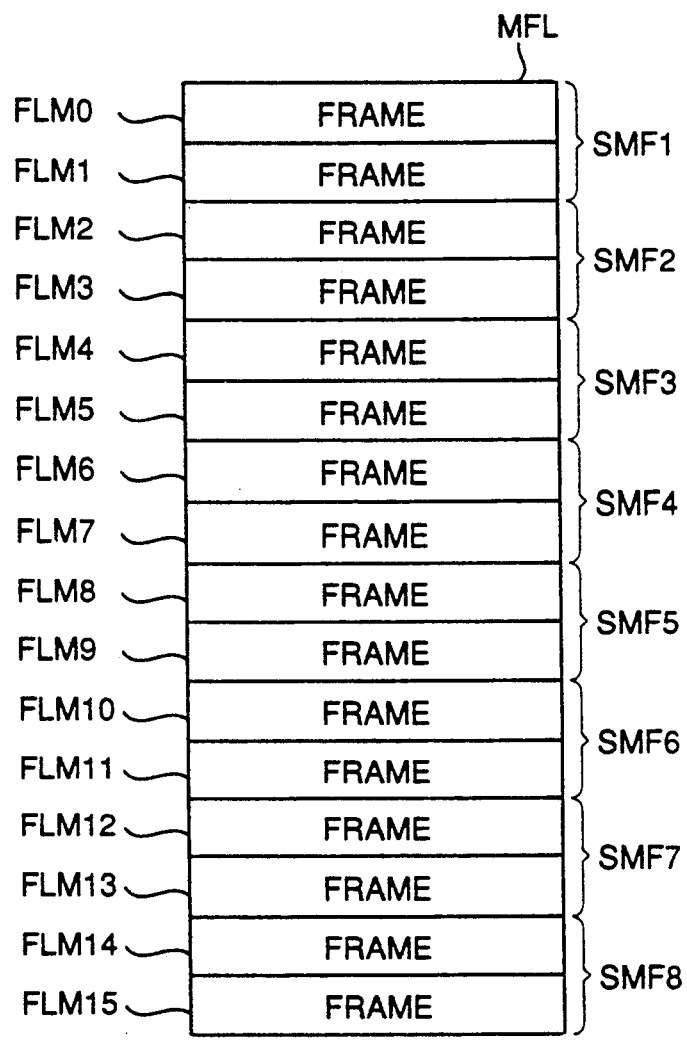
FIG. 6 is a diagram showing a frame format of data transferred using an information channel.

As shown in FIG. 6, one multiframe MFL consists of eight sub-multiframes SMF1-SMF8, each of which consists of two frames. That is, one multiframe MFL consists of 16 frames FLM0-FLM15.

Figure 7:
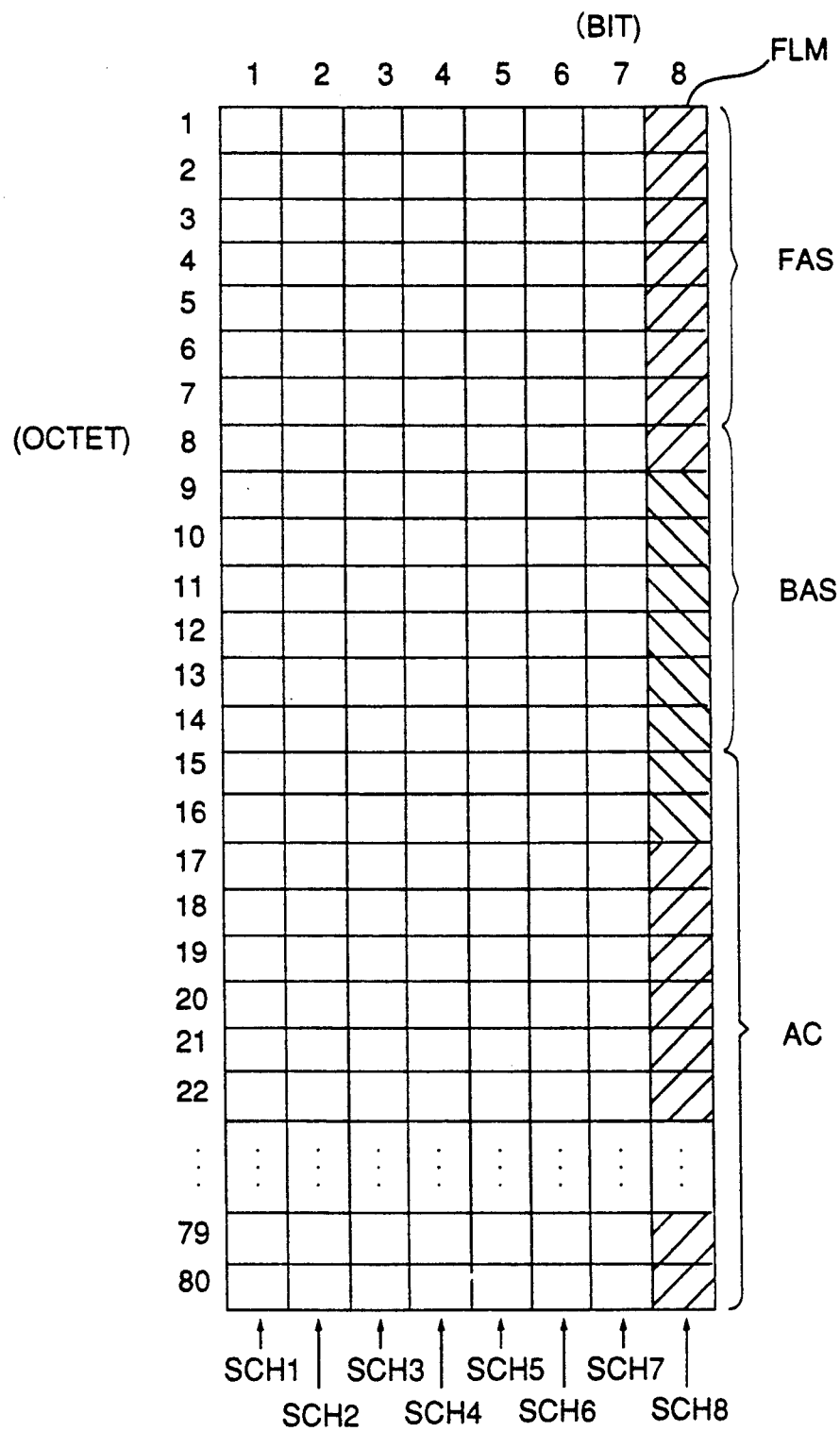
FIG. 7 is a diagram showing a signal format of frame data.

As shown in FIG. 7, each of the frames FLM0-FLM15 includes data amounting to 80 octets, and the bit positions in which these octets are disposed in bit sequence respectively form sub channels SCH1-SCH8. The eighth bit of each of the first to eighth octets forms a frame alignment signal FAS, and the eighth bit of each of the ninth to sixteenth octets forms a bit rate allocation signal BAS. That is, the sub channel SCH8 is allocated to the eighth bit of each of the 17th to 80th octets, and is sometimes called an application channel AC. The 17th to 24th octets in the sub channel SCH8 are optionally used for storing data of the cipher channel for transferring the key information for encipherment.

In the manner as described above, the frame alignment signal FAS has eight bits disposed in each of the frames FLM1-FLM16. As shown in FIG. 8, the bit allocation of the frame alignment signal FAS is formed in multiframe MFL unit. That is, a horizontal synchronizing signal of an eight-bit data pattern "00110111" is arranged in the second to eighth octets of the even-numbered frames FLM0, FLM2, ..., FLM14 and the second octets of the subsequent odd-numbered frames FLM1, FLM3, ..., FLM15. A vertical synchronizing signal of a six-bit data pattern "001011" is arranged in the first octets of the odd-numbered frames FLM1, FLM3, ..., FLM11. By detecting the horizontal and vertical synchronizing signals, it becomes possible to detect synchronism of one multiframe.

Bits N1, N2, N3, N4 and N5 of the first octets of the zeroth, second, fourth, sixth and eighth frames are used for showing a multiframe number. The bit N5 of these bits is used for showing whether or not the multiframe number is in use. Bits L1, L2 and L3 of the first octets of the 10th, 12th and 13th frames are used for showing a connection number indicating a sequence in which information channels carrying these frames are coupled to each other. A bit R of the first octet of the 15th frame is reserved for a future recommendation and set to zero.

A bit TEA of the first octet of the 14th frame is used for indicating a state where data cannot be transferred due to, for example, an internal failure of data terminal equipment. Bits A of the third octets of the odd-numbered frames FLM1, FLM3, ..., FLM15 are used for showing whether or not a frame alignment or multiframe alignment has been established or showing whether or not an out-of-alignment has occurred.

Bits C1, C2, C3 and C4 of the fifth, sixth, seventh and eighth octets of each of the even-numbered frames FLM1, FLM3, ..., FLM15 are used for forming a CRC code referred to in order to detect a data error (detection of the quality of a transmission path) regarding two consecutive frames (that is, sub-multiframe). A bit E of the fourth octet of each of the odd-numbered frames FLM1, FLM3, ..., FLM15 is used for showing that a transmission error has been detected on the reception side.

Figure 9:
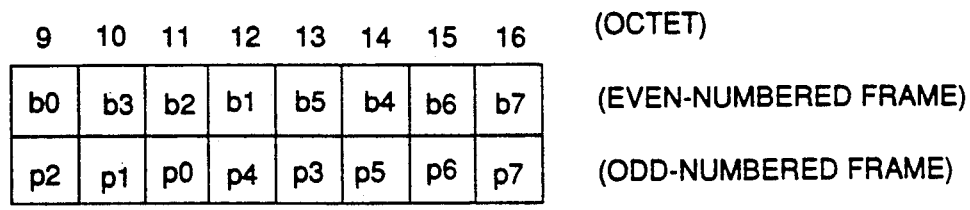
FIG. 9 is a diagram of a bit allocation signal.

As shown in FIG. 9, the bit rate allocation signal includes eight-bit data showing the capability BAS or BAS command respectively arranged in the even-numbered frames FLM0, FLM2, ..., FLM14. A duplex error correction code for correcting an error in the capability BAS or BAS command sent in the immediately previous frame is arranged in the subsequent odd-numbered frames FLM1, FLM3, ..., FLM15.

Figure 10:
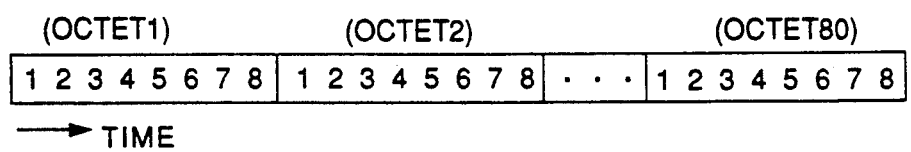
FIG. 10 is a diagram showing a sequence of transmission of frame data.

Data of the multiframe MFL is transmitted in order of frame number. As shown in FIG. 10, the frames FLM0-FLM15 are transmitted in order of an arrangement of the first to 80th octets. In each of the octets, the first octet is transmitted first. That is, in each of the frames FLM0-FLM15, the first bit of the first octet is sent first, and the eighth bit of the 80th octet is sent lastly.

Figure 11:
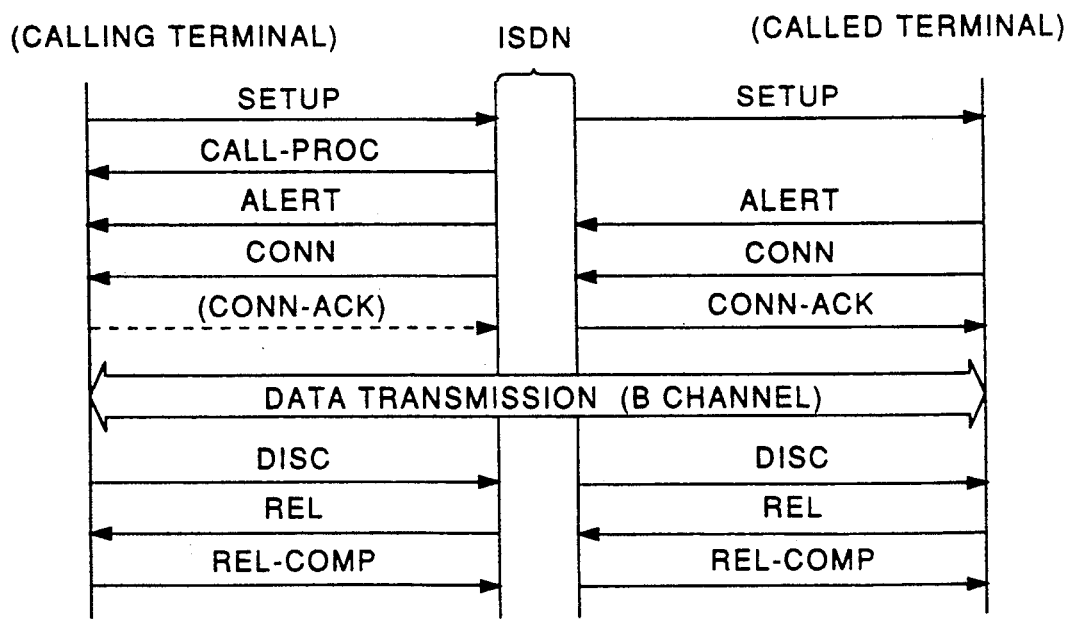
FIG. 11 is a time chart showing a call setup sequence executed by ISDN terminal equipment.

FIG. 11 shows a call setup sequence executed between terminals and the ISDN in a line exchange mode. A calling terminal sets the line exchange mode as a transmission mode, and sends the ISDN a call setup message SETUP specifying, as the destination party, a called terminal, whereby a call setup addressed to the called terminal is requested. The ISDN sends the call setup message to the specified called terminal in order to call out the destination party. Further, the ISDN sends back a call proceeding message (call setup acceptance message) CALL_PROC for the call setup status to the calling terminal.

The called terminal detects the call setup message, and then returns an alerting message ALERT to the ISDN, which sends the alerting message ALERT to the calling terminal in order to inform the calling terminal that calling the destination party is started. The called terminal responds to the call setup message and returns a connect message CONN to the ISDN, so that the calling terminal is informed that the called terminal has accepted the call. The ISDN sends a connection acknowledge message CONN_ACK to the called terminal in order to acknowledge the acceptance of the call. At this time, an information channel (B channel) for transferring data between the calling terminal and the called terminal is established.

Thereby, data transfer between the calling and called terminals using the information channel is mutually executed in a transmission control sequence set in the respective transmission functions of the calling and called terminals.

When the data transfer has been completed, the calling terminal sends a disconnect message DISC to the ISDN in order to request a release of the information channel. The ISDN sends a release message REL to the calling terminal in order to inform the calling terminal of clearing the information channel. Meanwhile, the ISDN sends a disconnect message DISC to the called terminal to thereby request a release of the information channel. The called terminal sends a release message REL to the ISDN so that the ISDN is informed of clearing the information channel.

The calling terminal sends the ISDN a release completion message REL—COMP informing the ISDN of the completion of clearing. Then the information channel between the calling terminal and the ISDN is released. Further, the ISDN sends a call completion message REL—COMP to the called terminal, so that the information channel between the ISDN and the called terminal is released. In the above manner, the information channel established between the calling terminal and the called terminal is completed and released.

As shown in FIG. 12A, each message for use in call setup in the ISDN includes a protocol identifier, a call number, a message type, an essential information element, and additional information element. The protocol identifier is used for identifying a protocol specification (format, sequence and so on) defining a layer-3 call setup message. The call number is used for showing which call is related to the message in which the call number is included. The message type is used for identifying the content of the message. The essential information element is necessarily included in the message. The additional information element is included in the message where necessary. Based on the message type, zero, one or a plurality of essential information elements are set, and zero, one or a plurality of additional information elements are arranged based on the setting situation of the essential information element.

As shown in FIG. 12B, the call setup message SETUP shows data indicating transmission capability as an essential information element, and the call number, the called number, the called sub address, a low layer compatibility, a high layer compatibility and user-user information.

The information element "transmission capability" includes information showing into which one of an audio signal, not-limited digital information, limited digital information, a 3.1 kHz audio signal, a 7 kHz audio signal and a video signal, information to be transmitted is categorized.

The information element "call number" shows the ISDN number of the calling terminal. The information element "called number" shows the ISDN number of the called terminal. The information element "called sub address" shows identifies a desired one of eight terminals connectable to the passive bus on the called terminal side.

The information element "low layer compatibility" is used for checking the compatibility of communications with the other terminal, and the basic contents thereof are the same as those of the information element "transmission capability". Further, more specified information (for example, the functions prescribed in the CCITT recommendation H.221) (the disclosure of which is hereby incorporated by reference) can be included in the information element "low layer compatibility".

The information element "high layer compatibility" is used for compatibility checking with respect to the other terminal, and shows which terminal functions are provided for. Examples of the terminal functions are a group 2/group 3 facsimile, a group 4 facsimile, a mixed mode, a teletex, a videotex, a telex, a message handling system and an audio/visual terminal.

The information element "user-suer" is used for transferring information between the users. The contents of the "user-user" information are transparently transferred to the other user without being interpreted by the ISDN.

Figure 13:
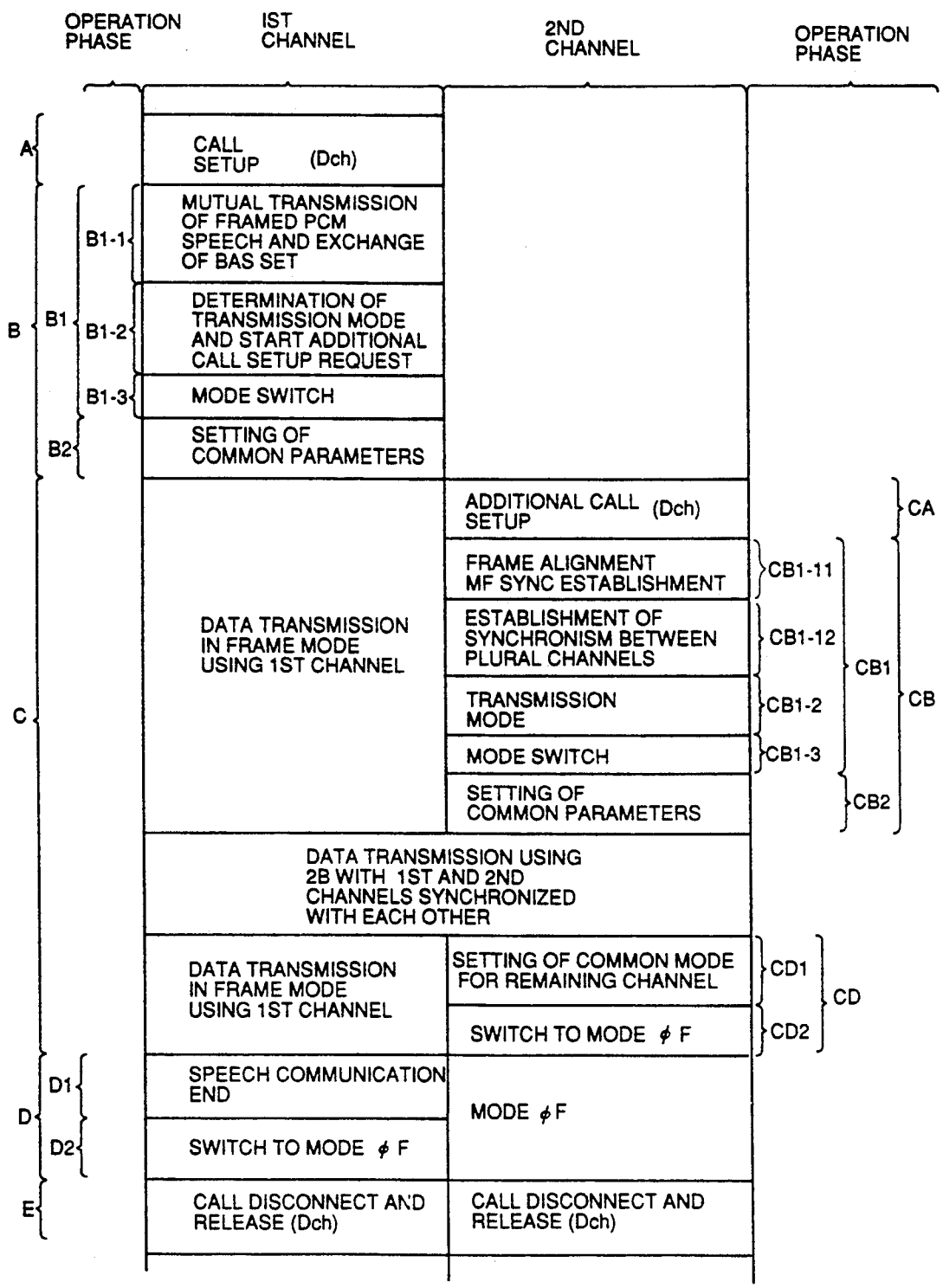
FIG. 13 is a time chart showing a transmission sequence executed by an audio/visual terminal.

FIG. 13 shows a transfer sequence executed when audio data and dynamic image data are between the audio/visual terminals using two information channels. The transfer sequence shown in FIG. 13 conforms to the TTC recommendations JT-H.242 and JT-H.320, the disclosure of which is hereby incorporated by reference.

A calling terminal calls a destination terminal and executes a call setup sequence on a signal channel. Thereby, one information channel (hereinafter referred to as a first channel) is ensured (phase A). A frame alignment procedure is carried out in such a manner that frame data having PCM audio data (A rule or μ rule, 64 Kbps) are transferred between the calling terminal and the called terminal. After the frame alignment is established, the capability BAS data and the command BAS data are mutually transferred between the calling terminal and the called terminal (phase B1-1). The transmission mode to be used is determined. Then, an additional call setup request for ensuring another (second) information channel is started (phase B1-2).

The transmission mode to be selected is a transmission mode that has the highest function among transmission modes in common to the calling and called terminals. The calling and called terminals know, from data exchanged between them, the transmission modes available in common thereto. The above selecting process is performed in phase B1-3. The calling terminal sends the called terminal the BAS command specifying the terminal function making the called terminal operate in the selected operation mode, and parameters in common to the device functions of the calling terminal and the called terminal are set (phase B2). Thereby, via the first channel, audio data (16 Kbps) and dynamic image data (46.4 Kbps) in conformity to the selected transmission mode are transferred (phase C).

After the data transfer in the frame mode via the first channel is started, the call setup sequence to the second information channel is carried out on the signal channel (phase CA). After the second information channel is established, frame data including only the frame alignment signal FAS and the bit allocation signal BAS are mutually transferred between the calling and called terminals via the second channel (phase CB1-1). In this manner, the frame alignment and multiframe alignment are established. Then, the first and second channels are synchronized with each other (phase CB1-12).

When the first and second channels have been synchronized with each other, the calling terminal sends the BAS command in order to determine the transmission mode (phase CB1-2). Then the transmission modes in the calling and called terminals are switched to the selected transmission mode (phase CB1-3), and parameters in common thereto are set (phase CB3).

In the above-mentioned manner, the initialization of the second channel is carried out. Thereafter, using the two information channels, audio data and dynamic image data are transferred in the state where frame data transferred via the first channel and frame data transferred via the second channel are in synchronism with each other. In this case, the audio data is transferred at an allocated bit rate of 48 Kbps, and the dynamic image data is transferred at an allocated bit rate of 76.8 Kbps.

The data transfer is terminated as follows. First, the second channel is disconnected. A procedure for setting a common mode is carried out for audio data transfer via only the first channel (phase CD1). In the second channel, the frame mode is switched to a mode OF (phase CD2). At this time, the first and second channels are in asynchronism with each other, and the call is held in the state where only the frame alignment signal FAS and the bit allocation signal BAS are transferred via the second channel. It is possible to release the second channel from the above state by the call disconnect/release of the signal channel.

In the first channel, audio data and dynamic image data are transferred at a total bit rate of 62.4 Kbps in the frame mode between the phase CD1 and the phase CD2. When the operator on one side ends speech, the transmission of dynamic image data is determined, and the mode is switched to mode OF in order to use all transmission capacity of the first channel (including the transmission rate shared to the dynamic image data) to transfer audio data (phase D2). Thereafter, the call in the first channel can be released by the call disconnect and release procedure for the signal channel. In the above manner, the call disconnect and release procedure for the first and second channels is carried out (phase E), and the audio/visual transmission between the two terminals is completed.

As mentioned above, in the audio/visual terminal, one information channel (the first channel) is ensured first and the frame mode is established. Thereafter, the bit allocation to the audio data and dynamic image data is carried out, so that data transfer is being carried out in a transient mode. The second channel is ensured by the call setting procedure for the signal channel if another information channel (the second channel) is simultaneously available. Then, the first channel, via which the transmission is being transiently carried out, and the second channel newly ensured are synchronized with each other. After the completion of this synchronization, the resetting of the bit allocation to audio data and dynamic image data is performed. In order to utilize an increased transmission rate by means of the information channels, the encoding rules (encoding methods) of audio data and dynamic image data are changed. In the above-mentioned manner, audio data and dynamic image data can be transmitted with a higher quality.

In order to terminate the data transmission, it is necessary to change the mode from the mode in which both the first and second channels are synchronized with each other to the mode in which only the first channel is used. For this requirement, the respective encoding rules of audio data and dynamic image data are set to systems most suitable for a transmission rate of 62.4 Kbps of the first channel, and the mode is changed to the transmission mode in which only the first channel is used. Simultaneously, the second channel is released from the state synchronized with the first channel, and the mode is switched to mode OF in which transmission of user data is idle. Thereby, the call is disconnected and released by the call disconnect/release procedure for the signal channel. In the first channel, the mode is changed from the mode in which audio and dynamic image data are transmitted to the mode OF in which only audio data is transmitted. After this, the call is disconnected and released by the call disconnect and release procedure for the signal channel. It is possible to directly change the first channel to the mode OF without being changed to the mode in which two types of data, namely, audio data and dynamic image data and then to disconnect and release the call. Accounting information obtained during the call disconnect and release procedure is managed for each channel.

In the present embodiment, in order to manage, by means of the communication server SVR, the status of use of information channels of the video phone terminal TTi and the telephone terminal TLi, the communication server SVR is informed, via the LAN, that the information channel will be used at the time of starting the call setup process executed by the video phone terminal TTi or the telephone terminal TLi. Further, in the present embodiment, the communication server SVR is informed, via the LAN, that the video phone TTi or the telephone terminal TLi will release the call.

The communication server SVR receives the notification of call setup and call release in the above-mentioned manner, and updates the aforementioned information channel management information concerning the passive bus BUS to which the terminal equipment which has been informed of the above. Then, the communication server SVR transmits, to all the terminals connected to the passive bus BUS being considered via the LAN, the contents of the channel bits CH after they are updated.

Figure 14:
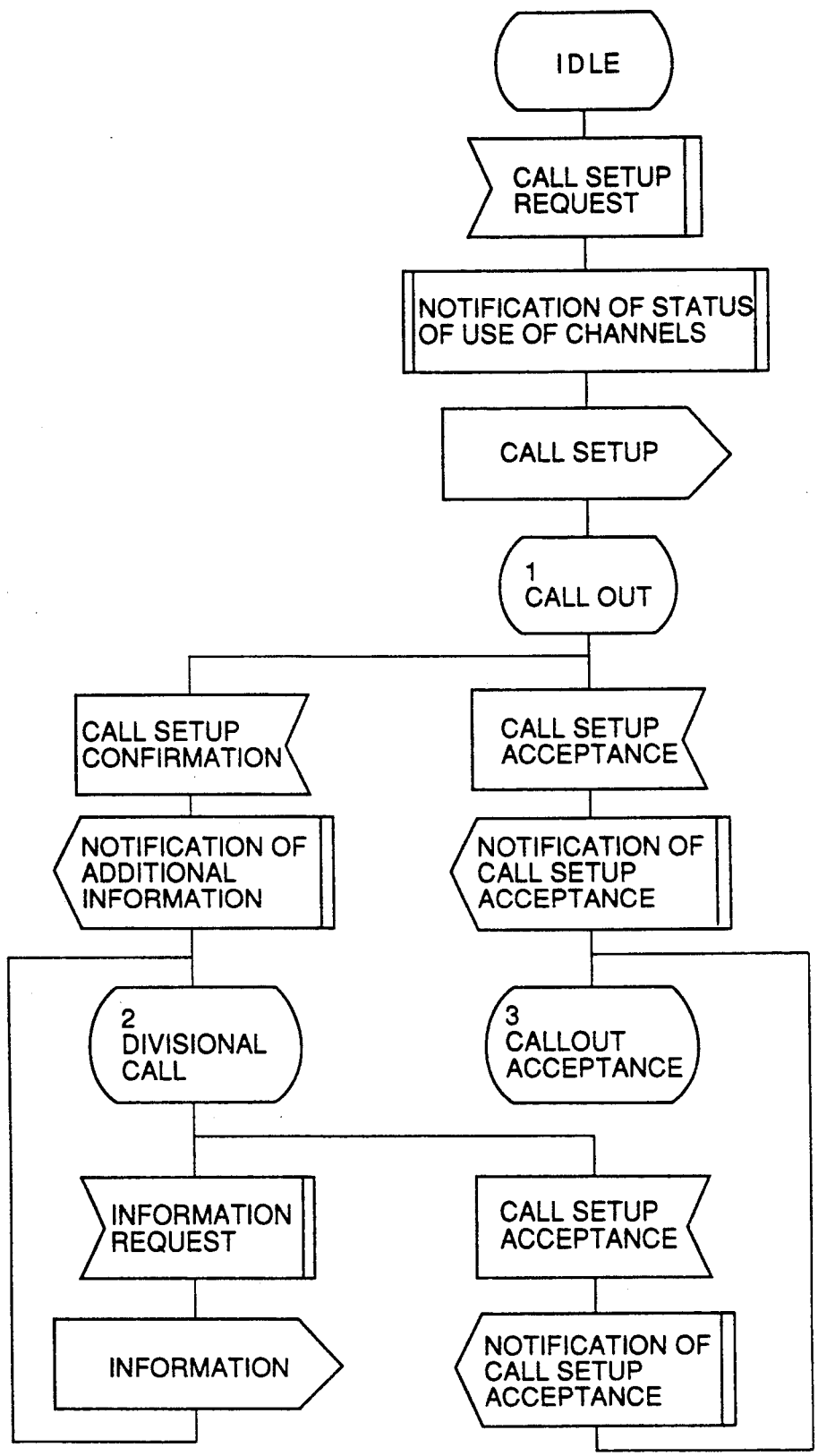
FIG. 14 is an SDL diagram showing a call-out sequence.

As shown in FIG. 14, in a call setup sequence (1 of 2) shown in FIG. 2—2 in (1 of 8) a) of JT-Q931, the disclosure of which is hereby incorporated by reference, immediately after a call setup request is internally generated in an idle state (call state number 0), the terminal, in which the above request has been generated, executes a call use status notification process for notifying the communication server SVR of the call setup.

Figure 15:
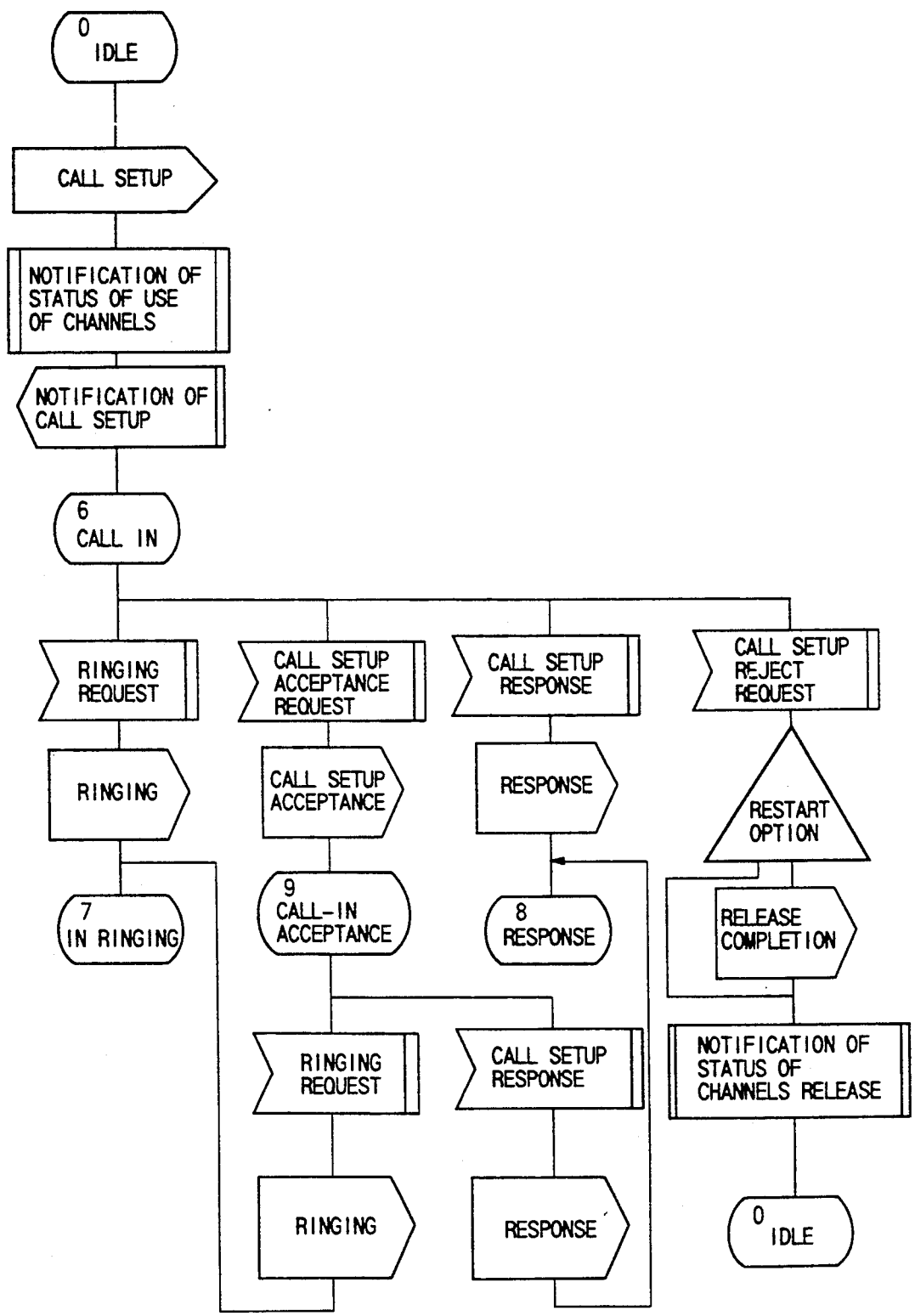
FIG. 15 is an SDL diagram showing a call-in sequence.

As shown in FIG. 15, in a call-in setup sequence (1 of 2) shown in FIG. 2—2 in (3 of 8) b) of JT-Q931, the disclosure of which is hereby incorporated by reference, the channel use status notification process is executed immediately after the call setup message SETUP is received in the idle state. If the call setup is rejected, the terminal executes a channel release state notification process which notifies the communication server SVR of the release of the call immediately before the terminal shifts to the idle state after sending a release complete message REL—COMP.

Figure 16:
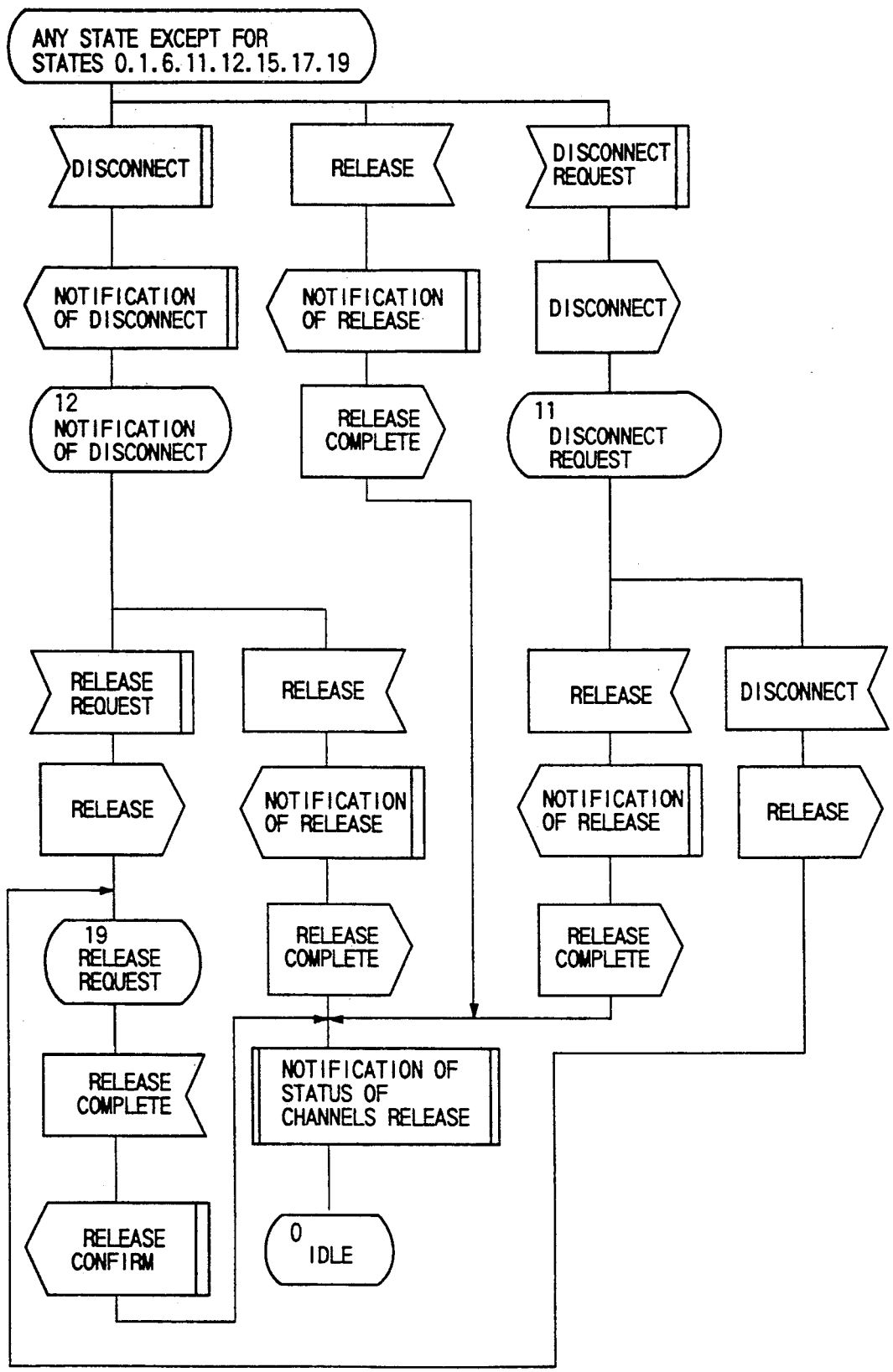
FIG. 16 is an SDL diagram showing a disconnect and clearing sequence.

As shown in FIG. 16, in a disconnect and clearing sequence shown in FIG. 2—2 in (6 of 8) d) of JT-Q931, the disclosure of which is hereby incorporated by reference, the channel release status notification process is executed before the terminal changes to the idle state after transmitting or receiving the call release completion message REL—COMP.

Figure 17:
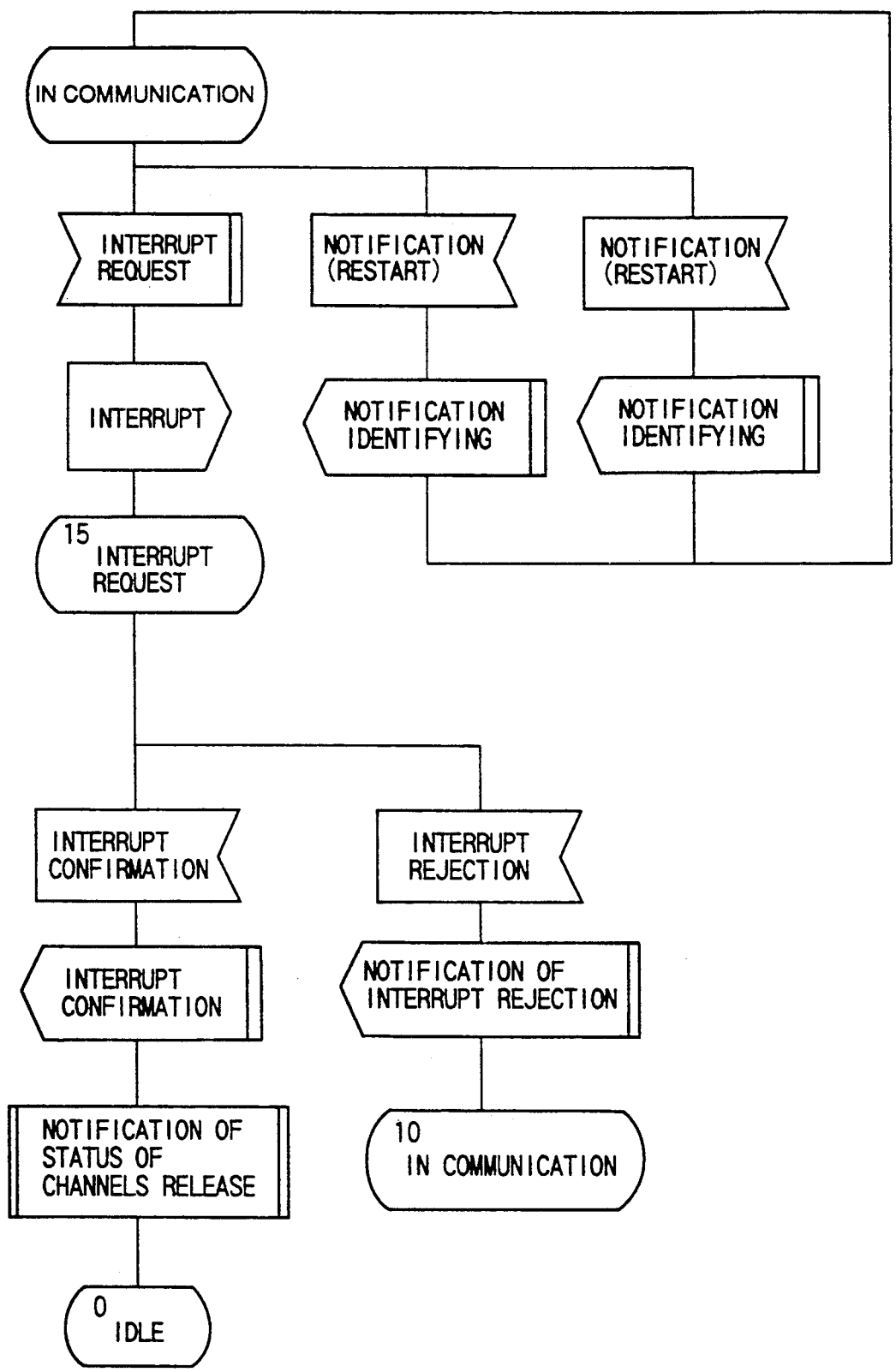
FIG. 17 is an SDL diagram showing an interrupt sequence.

As shown in FIG. 17, in an interrupt sequence shown in FIG. 2—2 in (7 of 8) of JT-Q931, the disclosure of which is hereby incorporated by reference, the channel release state notification process is carried out immediately before the terminal switches to the idle state from an interrupt confirmation state.

Figure 18:
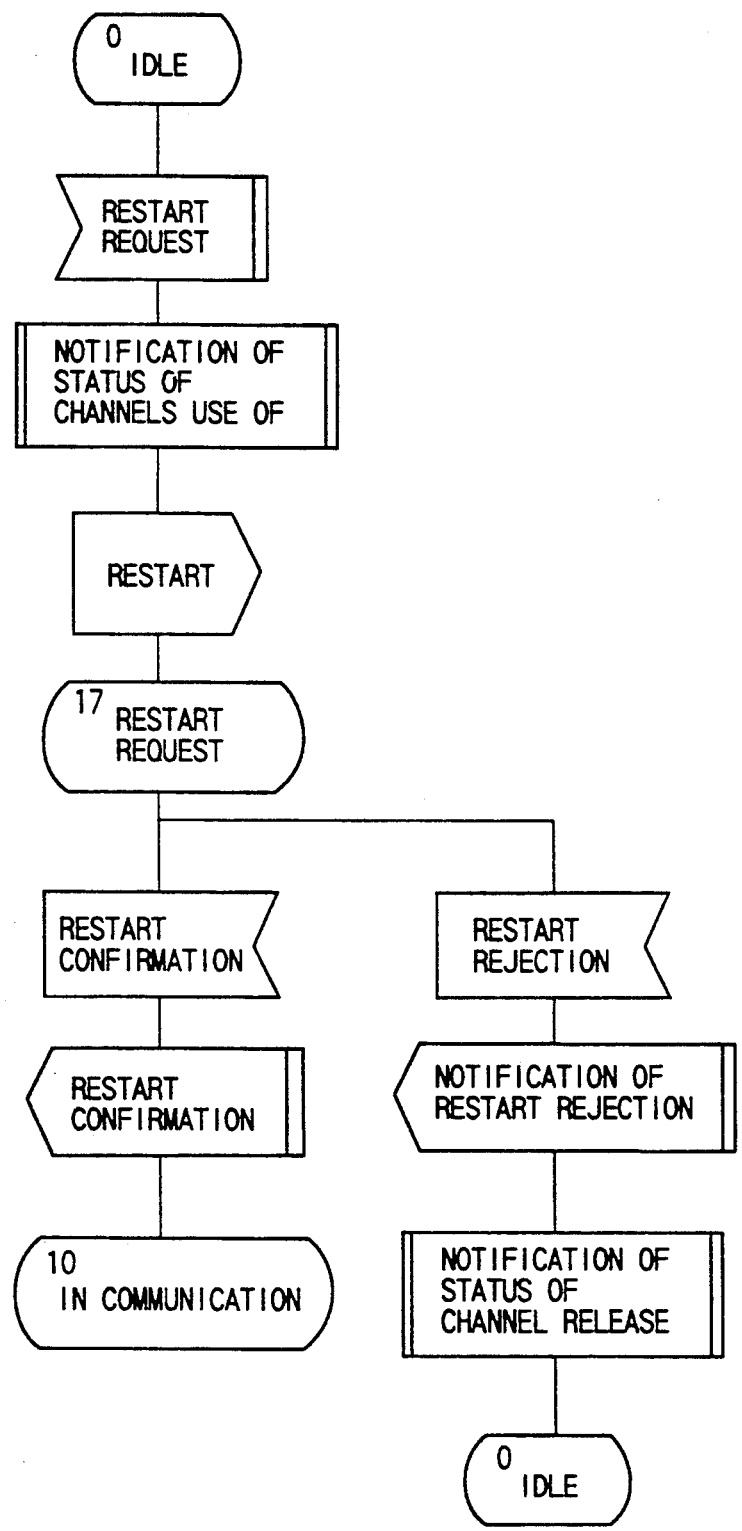
FIG. 18 is an SDL diagram showing a restart sequence.

As shown in FIG. 18, in a restart sequence shown in FIG. 2—2 in (8 of 8) of JT-Q931, the channel release status notification process is carried out immediately before the terminal switches to the idle state from a restart rejection notification state.

Figure 19:
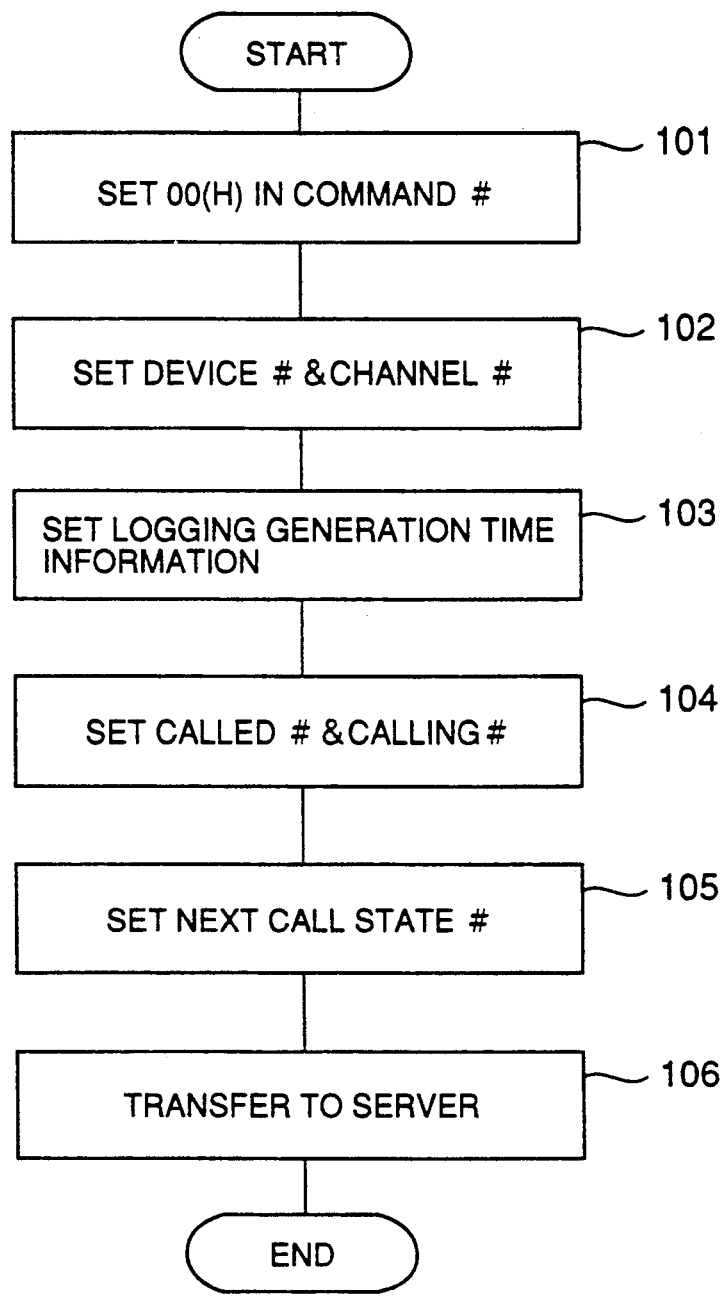
FIG. 19 is a flowchart showing a sequence for sending a logging command.

A description will now be given, with reference to FIG. 19, of the channel use status notification process and channel release status notification process of the telephone terminal TLi (that is, a non-audio/visual terminal) and the channel release notification process of the video phone terminal TTi (that is, an audio/visual terminal). The process shown in FIG. 19 is carried out using the logging command having a command value of data 00h.

At step 101, data 00h, which denotes the logging command, is set, as the command number, in the information element "command identifying information". At step 102, data having zeros set to all the items of the device number IDV are set in the information element "device number". Further, at step 102 data of zeros set to the R_LSW number, the NT number and the TE number in the channel information SSC are set in the "channel information" element. Moreover, at step 102 data showing an information channel to be used and released is set in the CH number.

At step 103, data showing a logging time is set in the information element "logging generated time information". At step 104, the values of the information elements "called number" and "calling number" relating to the call setup obtained at this time are set in the information elements "called number" and "calling number". At step 105, the value of the call state number relating to the calling state to which the terminal should shift is set in the information element "call state number".

Data relating to the communication server SVR is set in the information element "called sub address". Data set in the terminal being considered is set in the information element "calling sub address". Data which are valid are not set in the information elements "reason display information", "BAS capability/command" and "transmission path quality". At step 106, a data transfer process for sending the information elements set in the above to the LAN is activated. In this manner, the logging command is transferred to the communication server SVR.

The channel use status notification process of the video phone terminal TTi is executed by Data relating to the communication server SVR is set in the information element "called sub address". Data set in the terminal being considered is set in the information element "calling sub address". Data which are valid are not set in the information elements "reason display information", "BAS capability/command" and "transmission path quality". At step 206, a data transfer process for sending the information elements set in the above to the LAN is activated. In this manner, the logging command is transferred to the communication server SVR.

FIG. 21 shows the relation between the values of the call state number and related states. The details of the relation is described in the TTC recommendation JT-Q931, the disclosure of which is hereby incorporated.

Figure 20:
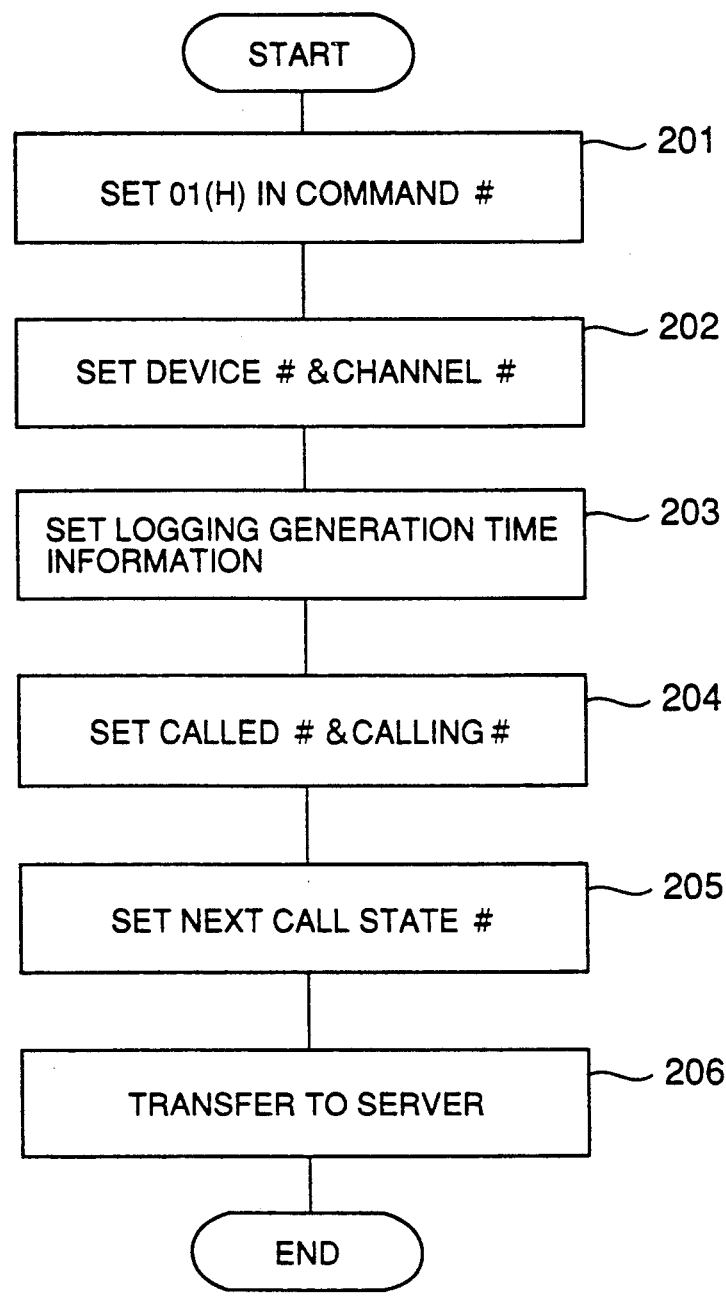
FIG. 20 is a flowchart showing a sequence for sending a logging and channel status request command.

Call state #0 denotes an idle state. Call state #1 denotes a calling state. Call state #2 denotes a segmented call state. Call state #3 denotes a call acceptance state. Call state #4 denotes a call-out notification state. Call state #6 denotes a call-in state. Call state #7 denotes a calling state. Call state #8 denotes a response state. Call state #9 denotes a call-in acceptance state. Call state #10 the logging and channel status request command having a command value of 01h. This process is shown in FIG. 20.

At step 201, data 01h showing the "logging and channel status request" command is set, as the command number, in the information element "command identifying information". At step 202, data having zeros set to all items of the device number IDV are set in the information element "device number".

Further, at step 202 data of zeros set to the R_LSW number, the NT number and the TE number in the channel information SSC are set in the "channel information" element. Moreover, at step 202 data showing an information channel to be used and released is set in the CH number.

At step 203, data showing a logging time is set in the information element "logging generated time information". At step 204, the values of the information elements "called number" and "calling number" relating to the call setup obtained at this time are set in the information elements "called number" and "calling number". At step 205, the value of the call state number relating to the calling state to which the terminal should shift is set in the information element "call state number". denotes an in-communication state. Call state #11 denotes a disconnect request state. Call state #12 denotes a disconnect notification state. Call state #15 denotes an interrupt request state. Call state #17 denotes a restart request state. Call state #19 denotes a release request state. Call state #19 denotes a release request state. Call state #25 denotes a segmented call-in state.

Figure 22:
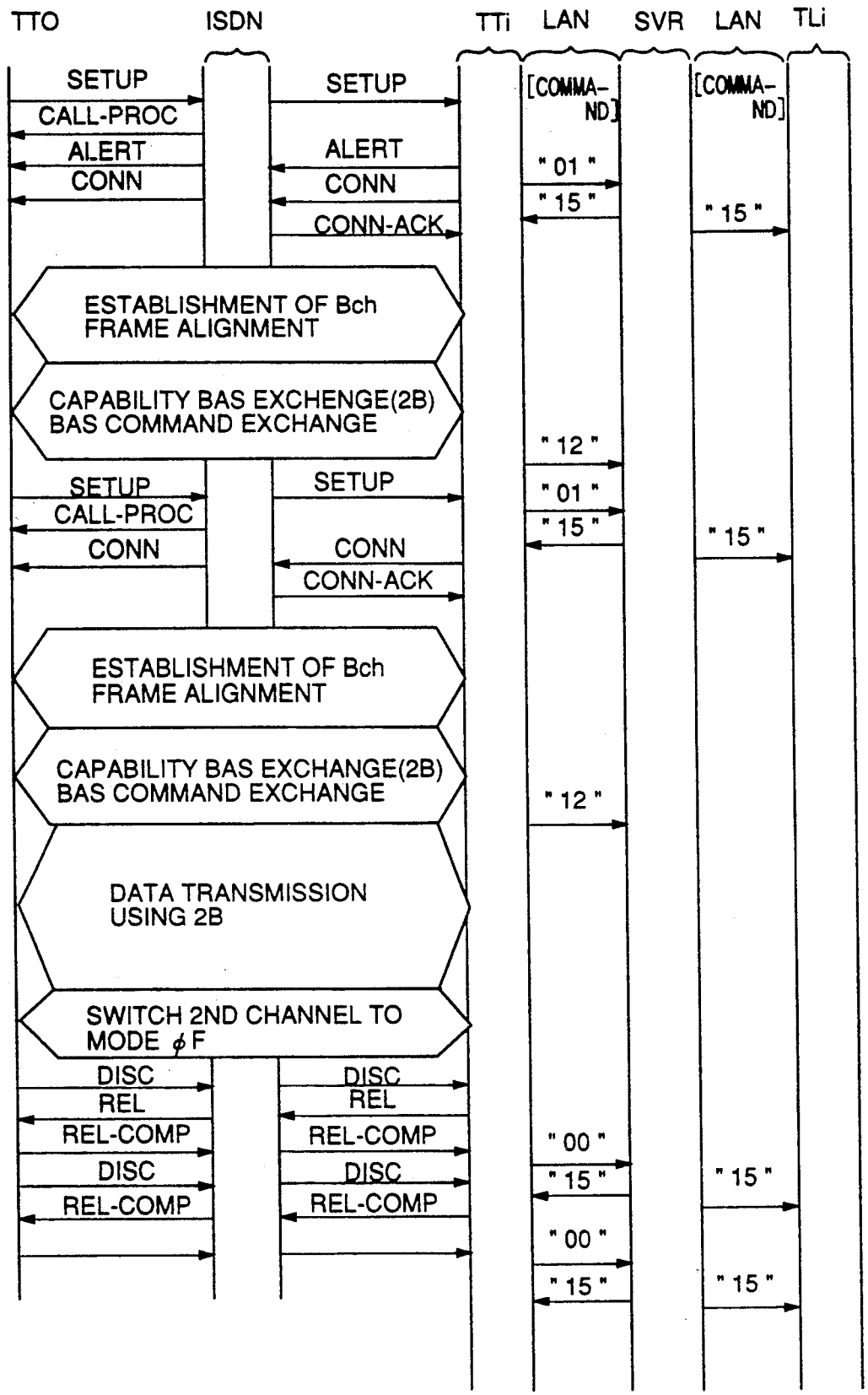
FIG. 22 is a time chart showing a sequence for transferring audio data and dynamic image data using two information channels by a video phone terminal.

FIG. 22 shows a sequence in which another video phone terminal TTo connected to the ISDN basic interface calls the video phone terminal TTi, and audio data and dynamic image data are transferred between them using two information channels.

The video phone terminal TTo sends the call setup message SETUP to the ISDN in order to call the video phone TTi. In response to receipt of the call setup message SETUP, the ISDN sends the call setup message SETUP to the video phone terminal TTi. Then, the ISDN sends the call proceeding message CALL_PROC to the video phone terminal TTo.

The video phone terminal TTi receives the call setup message SETUP, and switches to the calling state. Thereby, the video phone terminal TTi starts to send the ISDN the alerting message ALERT, and sends, via the LAN, the communication server SVR the aforementioned logging and channel status request command (command "01"). In response to receipt of the above command, the communication server SVR sets the calling sub address of the received command data to the device name NM, and extracts the information channel management information of the calling terminal (that is, the video phone terminal TTi) in the above-mentioned sequence. Then, the communication server SVR rewrites the channel bit CH relating to the notified information channel so that data 1 is written therein, and saves updated information channel management information. Further, the communication server SVR sends the cannel status information command (command "15") to all the terminals (that is, the video phone terminal TTi and the telephone terminal TLi) specified by the NT number in the updated information channel management information in order to inform these terminals of the content of the channel bit CH in the updated information channel management information.

In the channel status notification command (command "15"), data relating to the called (destination) terminal is set in the information element "called sub address", and data set in the communication server SVR is set in the information element "calling sub address". Further, data 15h denoting the "logging" command is set, as the command number, in the information element "command identifying information", and data, in which zeros are set to all the items of the device number IDV, are set in the information element "device number". Moreover, data, which has data zeros are set in all the R_LSW number, the NT number and TE number and which has data obtained by copying the contents of the channel bits CH of the information channel management information, are set in the information element "channel information".

Data showing the logging time is set in the information element "logging generated time information". The information elements "called number" and "calling number" relating to the call set up at the logging time are set in the information elements "called number" and "calling number", respectively. Valid data are not set in the information elements "reason display information", "BAS capability/command" and "transmission path quality".

Meanwhile, a predetermined call setup operation is carried out between the video phone terminals TTo and TTi. In this case, the channel status notification command (command "15") is received at a time immediately after the video phone terminal TTi sends the connection message CONN. In this manner, the video phone terminal TTi confirms that one information channel is being used, and recognizes that another information channel can be ensured.

When the information channel used as the first channel is established, the communication mode of the established first channel between the video phone terminals TTo and TTi is set to the frame mode, and the frame alignment in the first channel is established. Then, the video phone terminals TTo and TTi exchange the capability BAS and the BAS command between them, so that the transmission mode to be used is determined.

Since two information channels are in the usable state, and thus the video phone terminal TTi informs the video phone terminal TTo that the video phone terminal TTi has a data transfer capability equal to 2×64 Kbps when the capability BAS is specified. In this manner, the video phone terminal TTo recognizes that the video phone terminal TTi has a data transmission capability of 2×64 Kbps.

The video phone terminal TTi sends the capability BAS notification command (command "12") to the communication server SVR via the LAN in order to inform the communication server SVR of the content of the capability BAS obtained by the above exchanging operation. In this manner, the communication server SVR updates the communication recording concerning the first channel of the video phone terminal TTi.

In the capability BAS notification command (command "12"), data relating to the communication server SVR is set in the information element "called sub address", and data set in the video phone terminal TTi is set in the information element "calling sub address". Further, data 12h denoting the "capability BAS notification" command is set, as the command number, in the information element "command identifying information". Data having values of zeros set to all the items of the device number IDV are set in the information element "device number". Further, data of zeros set to the R_LSW number, the NT number and the TE number in the channel information SSC are set in the "channel information" element. Moreover, data showing an information channel used at this time is set in the CH number.

Data of the capability BAS obtained by the above-mentioned exchanging operation is set in the information element "BAS capability/command". Further, data showing the logging time is set in the information element "logging generated time information". The values of the information elements "called number" and "calling number" relating to the call setup processed at this time are set in the information elements "called number" and "calling number". Valid data are not set in the information elements "call state number", "reason display information" and "transmission path quality".

Then, the following is carried out in order to establish the second information channel. The video phone terminal TTo sends the ISDN to the call setup message SETUP. The call setup message SETUP for setting up an additional call is sent to the video phone terminal TTi.

Then, the video phone terminal TTi sends the logging and channel status request command (command "01") to the communication server SVR via the LAN in the same manner as described previously. The communication server SVR updates the information channel management information concerning the video phone terminal TTi in the same manner as described in the foregoing. Further, the communication server SVR sends the channel status notification command (command "15") for notification of the updated contents to the video phone terminals TTi and TTo via the LAN.

The second information channel is established between the video phone terminals Tto and Tti, and the frame alignment in the second channel and the synchronization between the first and second channels. Then the video phone terminals TTo and TTi exchange the capability BAS and the BAS command, so that the transmission mode is set. Then the mode switching for data transmission using the two information channels is carried out, and thereby audio data and dynamic image data are transferred using the two information channels.

When the exchanging the capability BAS is completed, the video phone terminal TTi informs, via the LAN, the communication server SVR of the capability BAS command (command "12"). Thereby, the communication server SVR updates the communication recording concerning the second channel of the video phone terminal TTi.

The communication between the video phone terminals TTo and TTi is terminated as follows. It is necessary to change the mode to the mode in which only the first channel is used. For this purpose, the respective encoding rules of audio data and dynamic image data are switched to a rule optimizing the modes to a transmission capacity of 62.4 Kbps. Thereby, the transmission mode using only the first channel is set. The second channel is released from synchronism with the first channel, and switched to mode OF in which user data is in the idle transmission state. The first channel is switched from the mode for transmission of audio data and dynamic image data to mode OF for transmission of only audio data. Then, the call disconnect and release procedure is carried out for each of the first and second channels, and data transmission operation is terminated.

In the above call disconnect and release sequence, the video phone terminal TTi sends the aforementioned logging command (command "00") to the communication server SVR when the releasing of one information channel is completed. Then the communication server SVR extracts the information channel management information concerning the video phone terminal TTi in the same manner as described previously. In this case, zero is set in the next call state number, the value of the channel bit CH relating to the specified information channel is updated. Then the communication server SVR sends, via the LAN, the video phone terminal TTi and the telephone terminal TLi the channel status notification command (command "15"), which informs these terminals the updated channel bit CH.

Figure 23:
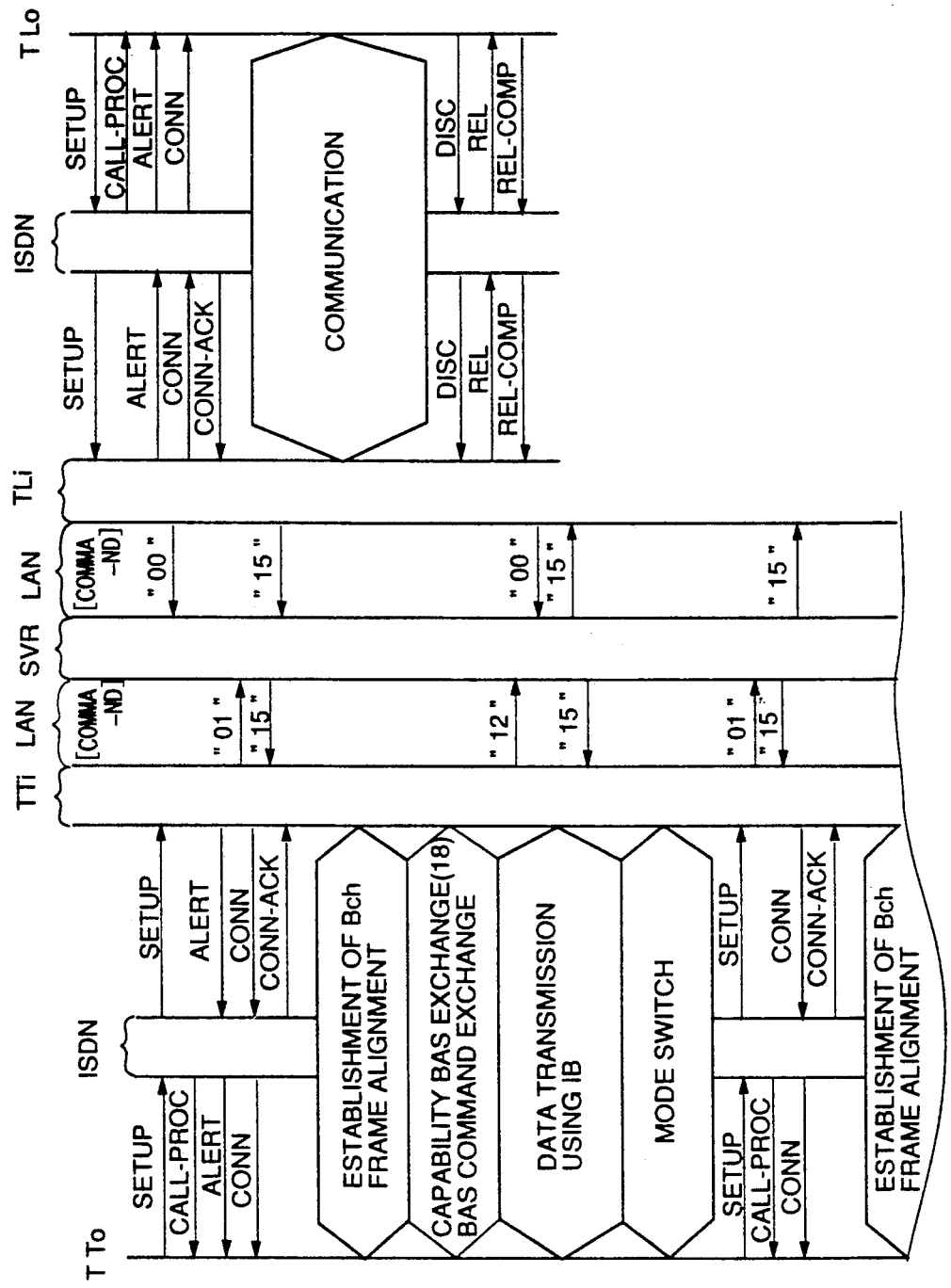
FIG. 23 is a time chart showing a speech communication operation of a telephone terminal and a sequence for transferring audio data and dynamic image data.

FIG. 23 shows a sequence in which the telephone terminal TLi is called from another telephone terminal TLo, and the video phone terminal TTi is called by another video phone terminal TTo. The telephone terminal TLo sends the ISDN the call setup message SETUP for calling the telephone terminal TLi. The ISDN sends the call setup message SETUP to the telephone terminal TLi, and sends the call proceeding message CALL_PROC to the telephone terminal TLo. The telephone terminal TLi receives the call setup message SETUP, and then switches to a calling state. Then, the telephone terminal TLi starts to send the ISDN the alerting message ALERT, and sends the aforementioned logging command (command "00") to the communication server SVR via the LAN. In this manner, the communication server SVR updates the information channel management information concerning the telephone terminal TLi in the same manner as has been described previously.

In parallel to the above process, the call setup sequence is executed between the telephone terminals TLi and TLo, so that an information channel for communication is established. Then the communication between the terminals TLi and TLo takes place.

The video phone terminal TTo sends the ISDN the call setup message SETUP for calling the video phone terminal TTi at a time which lags behind the time when the telephone terminal TLo sends the ISDN the call setup message SETUP. The ISDN sends the call setup message SETUP to the video phone terminal TTi. Then the ISDN sends the call proceeding message CALL_PROC to the video phone terminal TTo.

The video phone terminal TTi receives the call setup message SETUP, and starts to send the alerting message to the ISDN. Then the video phone terminal TTk sends the logging and channel status request command (command "10") to the communication server SVR via the LAN. The communication server SVR updates the information channel management information concerning the video phone terminal TTi in the same manner as has been described previously. Then the communication server SVR informs, via the LAN, the video phone terminal TTi and the telephone terminal TLi of the channel status notification command (command "01"). In the above-mentioned manner, the video phone terminal TTi confirms that two information channels are being used, and recognizes that there is no available information channel.

When the information channel used as the first channel has been established, the communication mode of the first channel established between the video phone terminals TTo and TTi is set to the frame mode. Then, the frame alignment in the first channel is established. Thereafter, the terminals exchange the capability BAS and BAS command. Thereby, the transmission mode to be used is determined.

At this time, the video phone terminal TTi informs the other party that the video phone terminal TTi has a data transfer capability of 1×64 Kbps when specifying the capability BAS, since only one information channel is available at this time. The video phone terminal TTo recognizes that the terminal TTi has a data transfer capability of 1×64 Kpbs. The video phone terminal TTi sends, to the communication server SVR via the LAN, the capability BAS command (command "12") to inform the communication server SVR of the contents of the capability BAS exchanged at this time. Thereby, the communication server SVR updates the communication recording concerning the first channel of the video phone terminal TTi.

When the first channel has switched to the data transmittable state in the frame mode, audio data (16 Kbps) and dynamic image data (46.4 Kbps) are transferred between the video phone terminals TTo and TTi using the first channel.

When communication between the telephone terminals TTo and TLi ends and information channel between them has been disconnected and released, the telephone terminal TLi sends the logging command (command "00") to the communication server SVR via the LAN. Then the communication server SVR extracts the information channel management information concerning the telephone terminal TLi in the same manner as has been described previously. In this case, the next call state number has been set to zero. Thus, the value of the channel bit CH relating to the specified information channel is updated so that it becomes zero. Then, the communication server SVR sends the channel status notification command (command "15") to the video phone terminal TTi and the telephone terminal TLi via the LAN.

The video phone terminal TTi recognizes that another information channel has become available. Thus, the video phone terminal executes a dynamic mode switching procedure, and starts to a BAS exchanging sequence. This capability BAS informs the video phone terminal TTo that the video phone terminal TTi has a data transfer capability of 2×64 Kbps. Thereby, the video phone terminal TTo recognizes that another information channel is in the usable state. Then, the video phone terminal TTo sends the call setup message SETUP to the ISDN, which sends the call setup message SETUP for setting up the additional call setup to the video phone terminal TTi.

A procedure to be executed after this is executed in the same manner as shown in FIG. 22. The second channel between the video phone terminals TTo and TTi is ensured, and then the frame alignment and the multiframe alignment in the second channel are established. Audio data (16 Kbps) and dynamic image data (108.8 Kbps) are transferred between the terminals TTi and TTo from the time when data synchronization between the first and second channels has just been established.

When communication between the video phone terminals TTo and TTi ends, the second channel is switched to mode OF, which is a non-frame mode, in the same manner as has been described previously. The call disconnect and release procedure with respect to the first and second channels is carried out. In this manner, the communication is completely terminated.

The video phone terminal TTi sends the clogging command (command 200") to the video phone terminal TTi when the information channels have been respectively released. Thereby, the communication server SVR sends the channel status notification command (command "15") to the video phone terminals TTi and TLi via the LAN in order to inform these terminals of the releasing of the information channels.

According to the present embodiment, the video phone terminal TTi and the telephone terminal TLI are respectively informed, by means of the communication server, of the status of use of the information channels on the passive bus BUS to which the video phone terminal TTi and the telephone terminal TLi. Thus, the communication terminal TTi can determine the value of the capability BAS to be exchanged between the terminals on the basis of the number of available channels obtained at this time. As a result, it becomes possible to avoid a situation where an invalid call is generated as has been described previously by additionally setting up a call when there is no idle information channel.

Figure 24:
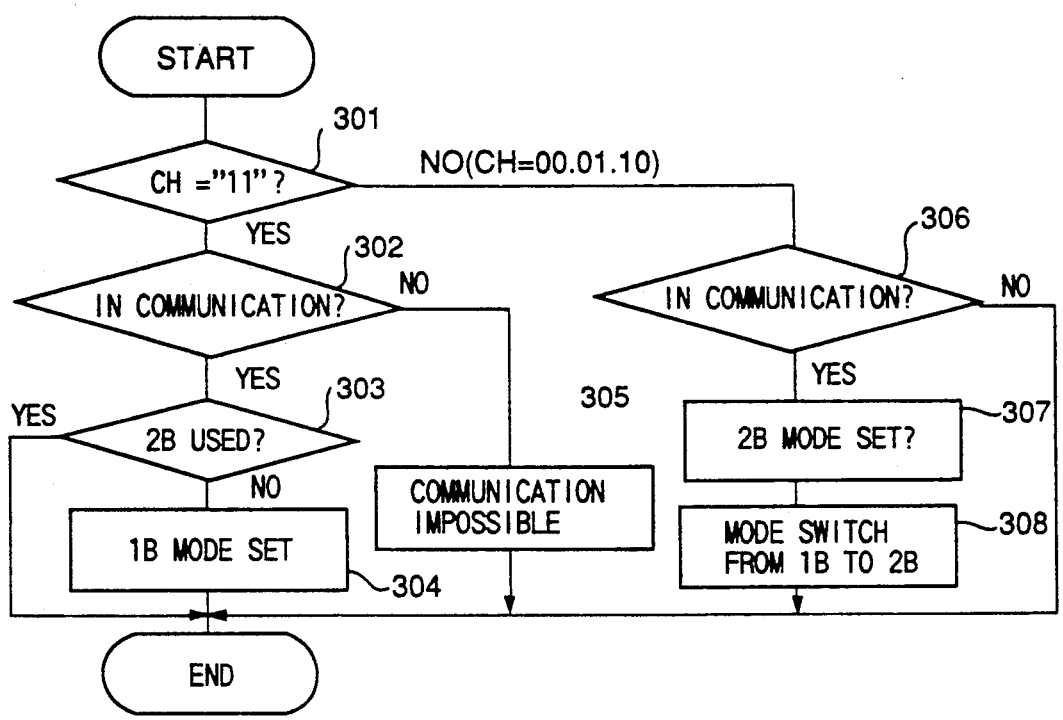
FIG. 24 is a flowchart showing a sequence executed by a video phone terminal when receiving a channel status notification command.

FIG. 24 shows a process executed by the video phone terminal TTi when it has received the channel status notification command (command "15"). In response to receipt of the channel status notification command (command "15"), at step 301 the video phone terminal TTi determines whether or not the CH number contained in the information element "channel information"indicates data "11". When the result of this determination is YES, the two information channels in the passive bus BUS to which the video phone terminal TTi is connected are being used. Thus, the video phone terminal TTi determines, at step 302, whether or not it is executing the communication operation. When the result of this determination is YES, the video phone terminal TTi determines, at step 303, whether or not the two information channels are now busy.

When the result of this determination is NO, it is impossible to ensure another information channel. Thus, at step 304, the video phone terminal TTi determines that the data transfer capability obtained at present is equal to 1×64 Kbps. When the result of the determination obtained at step 302 is NO, at step 305 the video phone terminal TTi stores data showing that the video phone terminal TTi is in the communication impossible state.

When the result obtained at step 301 is NO, at step 306 the video phone terminal TTi determines whether or not it is executing the communication operation. When the result obtained at step 306 is YES, the two information channels are being used. Thus, at step 307 the video phone terminal TTi determines that the data transfer capability obtained at present is equal to 2×64 Kbps, and at step 308 switches the communication mode so that the data transfer capability is changed from 1×64 Kbps to 2×64 Kbps.

Figure 25:
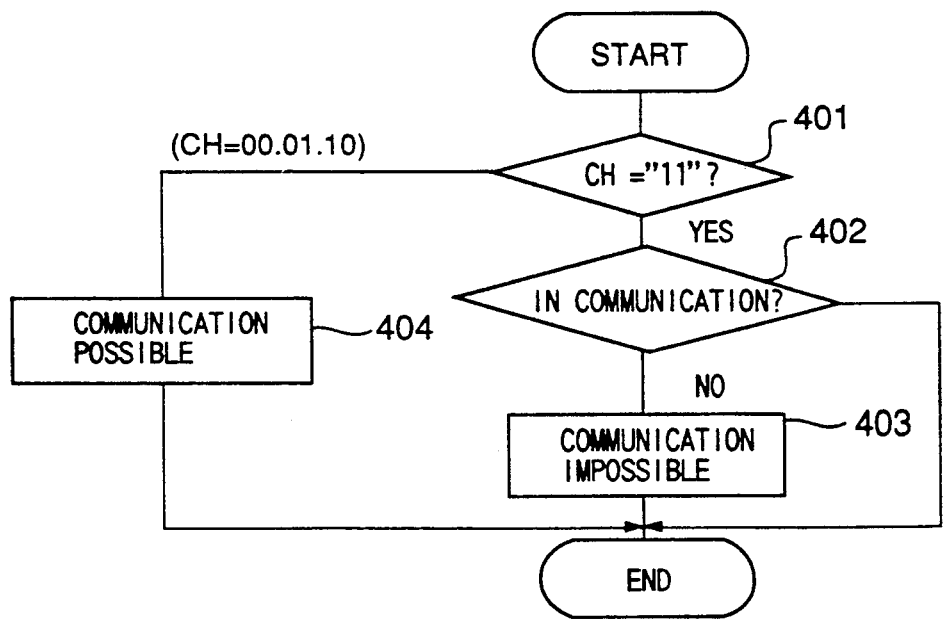
FIG. 25 is a flowchart showing a sequence executed by a telephone terminal when receiving a channel status notification command.

FIG. 25 shows a process executed by the telephone terminal TLi when receiving the channel status notification command (command "15"). In receipt of the channel status notification command, the telephone terminal TLi determines, at step 401, whether or not the CH number contained in the information element "channel information"indicates data "11". When the result obtained at step 401 is YES, the two information channels in the passive bus BUS to which the telephone terminal TLi is connected are busy. Thus, the telephone terminal TLi determines, at step 402, whether or not the telephone terminal TLi is executing the communication operation. When the result obtained at step 402 is YES, at step 403 the telephone terminal TLi stores data showing that the telephone terminal TLi is now in the communication impossible state.

When the result obtained at step 401 is NO, one or more information channels are available. Thus, at step 404 the telephone terminal TLi stores data showing the telephone terminal TLi is in the communicable state.

Figure 26:
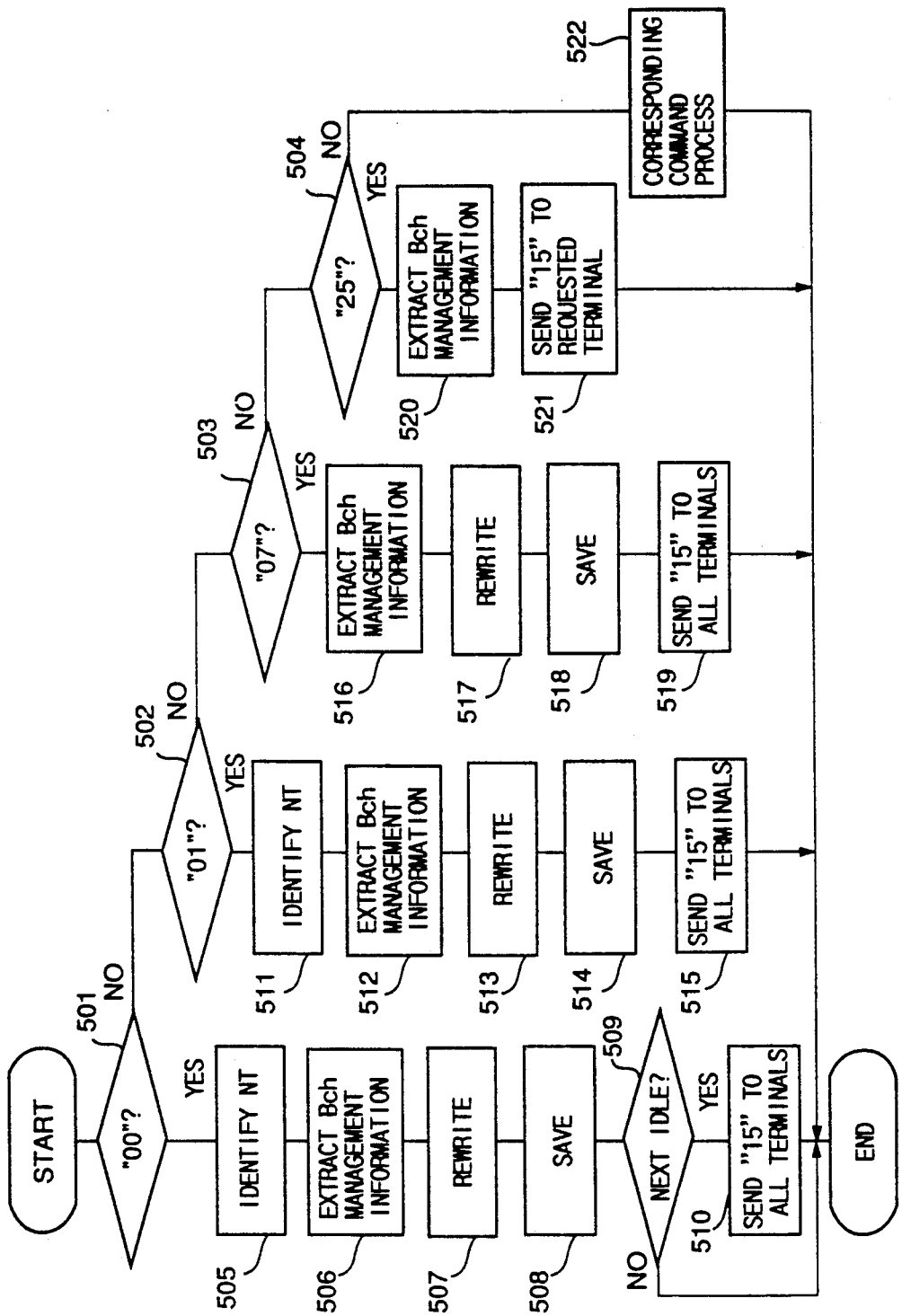
FIG. 26 is a flowchart showing a sequence executed by the communication server when receiving command data.

FIG. 26 shows a process executed by the communication server SVR when receiving command data via the LAN. The communication server SVR determines which one of data "00", "01", "07"and "25"the command identifying information contained in command data received via the LAN indicates (steps 501, 502, 503 and 504).

When the received command data is the logging command and thus the result of the step 501 determination is YES, at step 505 the communication server SVR identifies the NT number of the calling terminal by setting, to the device name NM, the content of the information element "calling sub address"contained in the received command data. At step 506, the communication server SVR extracts the information channel management information stored in the identified NT number. When the value of the information element "call state number"is zero, at step 507 the channel bit CH relating to the notified information channel is rewritten so that it shows data zero. When the information element "call state number"shows a value other than zero, at step 507 the channel bit CH relating to the notified information channel is rewritten so that it shows data 1. The updated information channel management information is saved at step 508.

At step 509, the communication server SVR determines whether or not the value of the information element "call state number" is zero. When the result of this determination is YES, at step 510 the communication server SVR sends, via the LAN, the channel status notification command (command "15") to all the terminals relating to the NT number contained in the updated information channel management information. In this manner, all the terminals relating to the above NT number are informed of the content of the channel bit CH contained in the updated channel status management information.

When the command data received via the LAN is the logging and channel status request command and hence the result of the step 502 determination is YES, at step 511 the communication server SVR identifies the NT number of the calling terminal by setting, to the device name NM, the content of the information element "calling sub address" contained in the received command data in the same manner as has been described previously. At step 512, the communication server SVR extracts the information channel management information stored in the identified NT number. At step 513, the communication server SVR rewrites the channel bit CH relating to the notified information channel so that it shows data 1. At step 514, the communication server SVR saves the updated information channel management information.

At step 515, the communication server SVR sends, via the LAN, the channel status notification command (command "15") to all terminals relating to the NT number contained in the updated information channel management information. In this manner, all the terminals relating to the above NT number are informed of the content of the channel bit CH contained in the updated information channel management information.

When the command data received via the LAN is the network joint command and hence the result of the step 503 determination is YES, the communication server SVR identifies the information elements "device number" and "channel information" contained in the command data, and extracts the information channel management information relating to the identified NT number at step 516. When the value of the information element "call state number" is zero, at step 517 the communication server SVR rewrites the channel bit CH relating to the notified information channel so that it shows data zero. When the information element "call state number" indicates a value other than zero, the communication server SVR rewrites the channel bit CH relating to the notified information channel so that it shows data 1. At step 518, the communication server SVR saves the updated information channel management information.

At step 519, the communication server SVR sends, via the LAN, the channel status notification command (command "15") to all terminals relating to the NT number contained in the updated information channel management information. In this manner, all the terminals relating to the above NT number are informed of the content of the channel bit CH contained in the updated information channel management information.

When the command data received via the LAN is the channel status request command and hence the result of the step 504 determination is YES, the communication server SVR identifies the NT number of the calling terminal by setting, to the device name NT, the content of the information element "calling sub address", and extracts the information channel management information contained in the identified NT number at step 520. At step 521, the communication server SVR sends the channel status notification command (command "15") to the calling terminal via the LAN. In this manner, the calling terminal is informed of the content of the channel bit CH in the extracted information channel management information.

When a command other than the above-mentioned commands is received and the result of the step 504 determination is NO, the communication server SVR executes a process corresponding to the received command data.

The above description relates to the case where the video phone terminal TTi and the telephone terminal TLi are directly connected to the ISDN. The present invention includes a case where the video phone terminal TTi and the telephone terminal TLi are connected to extension lines of a digital private branch exchange.

Figure 27:
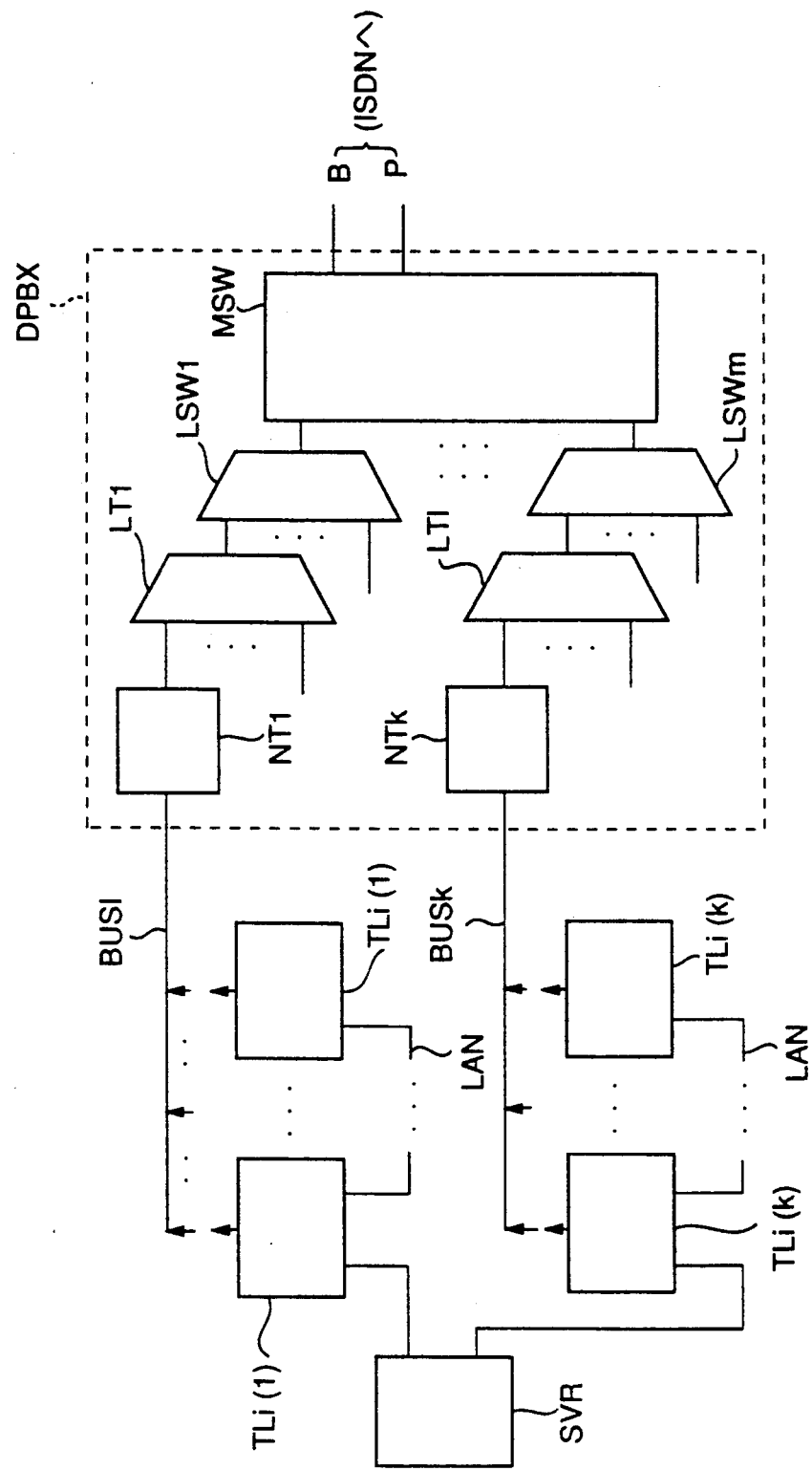
FIG. 27 is a block diagram of a communication system according to a second embodiment of the present invention.

FIG. 27 shows a communication system according to a second embodiment of the present invention, in which video phone terminals and telephone terminals are connected to extension lines of a digital private branch exchange. In FIG. 27, those parts which are the same as those shown in FIG. 1 are given the same reference numerals.

Referring to FIG. 27, a basic interface line B and a primary rate line P in conformity to the ISDN are connected to an external-line side of a main switch MSW of a digital private branch exchange DPBX. A plurality of line concentration switches LSW1 - LSWm are connected to an internal-line side of the main switch MSW. A plurality of transmission path terminating devices LT1 - LTI are connected to the line concentration switches LSW1 - LSWm, as shown in FIG. 27. A plurality of network terminating devices NT1 - NTk are connected to the transmission path terminating devices LT1 - TLI. Passive buses BUS1 - BUSk are connected to the network terminating devices NT1 - NTk, respectively.

Video phone terminals TTi(1) - TTi(k) and telephone terminals TLi(1) - TLi(k), which are connected to the passive buses BUS1 - BUSk, respectively, are coupled to the digital private branch exchange DPBX via a local area network LAN. The communication server SVR is connected to the LAN.

The passive buses BUS1 - BUSk connected to the internal-line side of the digital private branch exchange DPBX can be individually identified by specifying the LSW number assigned to each of the line concentration switches LSW1 - LSWm, the LT number assigned to each of the transmission path terminating devices LT1 - LT1, and the NT number assigned to each of the network terminating devices NT1 - NTk. The communication server SVR has the aforementioned device name/line information conversion table, in which the above-mentioned data are defined for each of the passive buses BUS1 - BUSk.

In this case, the following process is carried out in the same manner as has been described previously in order to manage, by means of the communication server SVR, the status of use of information channels relating to the video phone terminals TTi(1) - TTi(k) and the telephone terminals TLi(1) - TLi(k). When the video phone terminals TTi(1) - TTi(k) and the telephone terminals TLi(1) - TLi(k) start the call setup sequence, they informs, via the LAN, the communication server SVR of information showing that they will use information channels. When the video phone terminals TTi(1) - TTi(k) and the telephone terminals TLi(1) - TLi(k) release calls, they informs, via the LAN, the communication server SVR that the calls have been released.

In response to each receipt of the call setup notification or call release notification, the communication server SVR updates the information channel management information concerning the passive bus via which the above notification has been received. Then the communication server SVR sends, via the LAN, the content of the channel bit CH contained in the updated information channel management information to all the terminals connected to the passive bus via which the notification has been received.

Figure 28:
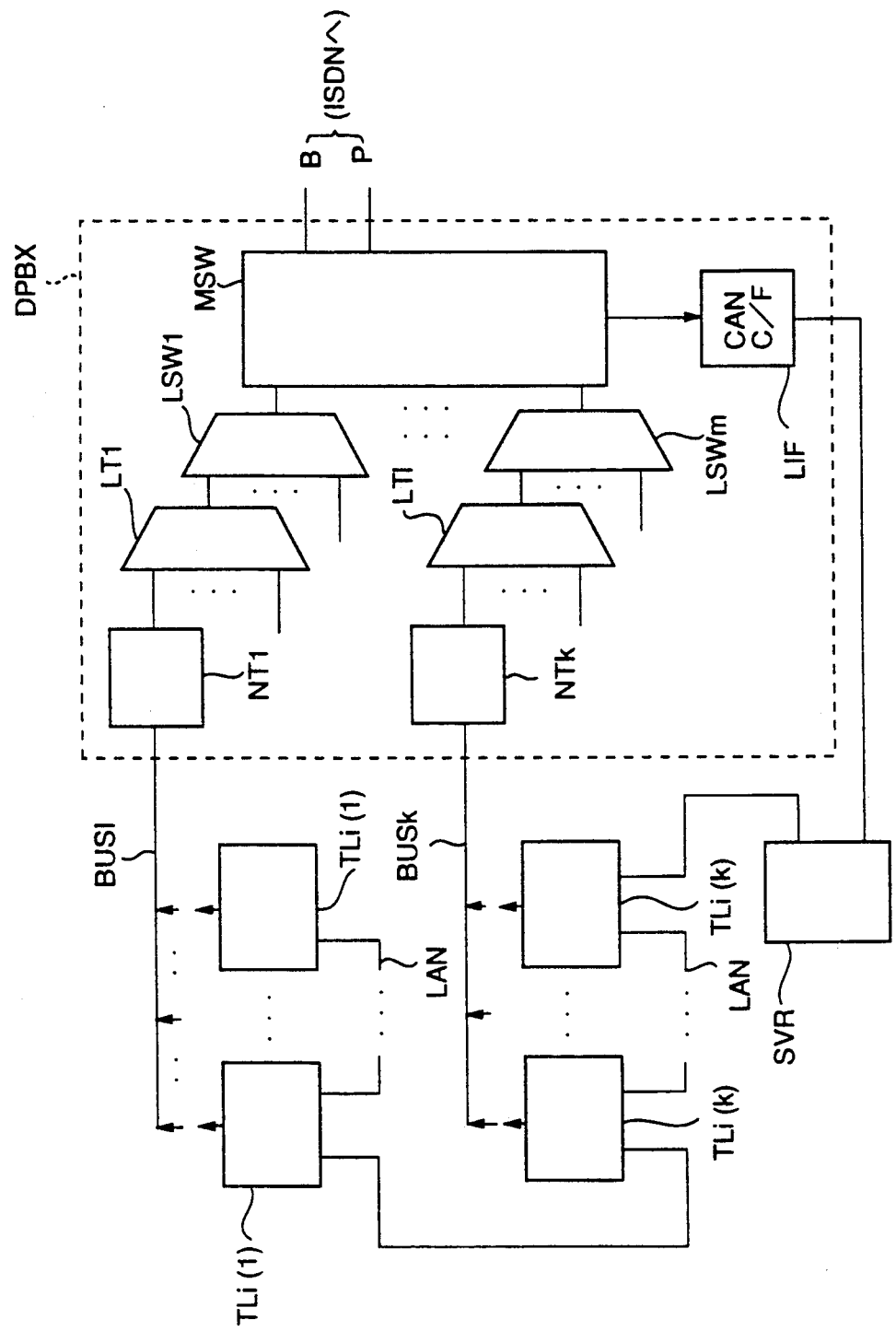
FIG. 28 is a block diagram of a communication system according to a third embodiment of the present invention.

FIG. 28 shows a communication system according to a third embodiment of the present invention. The configuration shown in FIG. 28 is obtained by adding, to the digital private branch exchange DPBX shown in FIG. 27, a local area netwcrk interface circuit LIF connected to the LAN. In FIG. 28, those parts which are the same as those shown in FIG. 27 are given the same reference numerals.

In order to manage, by means of the communication server SVR, the status of use of the video phone terminals TTi(1) - TTi(k) and the telephone terminals TLi(1) - TLi(k), the digital private branch exchange DPBX informs, via the LAN, the communication server SVR that information channels will be used, when the video phone terminals TTi(1) - TTi(k) and the telephone terminals TLi(1) - TLi(k) start to execute the call setup sequence. Further, when the video phone terminals TTi(1) - TTi(k) and the telephone terminals TLi(1) - TLi(k) release calls, the exchange DPBX informs, via the LAN, the communication server SVR that the calls have been released.

In response to each receipt of the call setup notification or call release notification, the communication server SVR updates the information channel management information concerning the passive bus via which the above notification has been received. Then the communication server SVR sends, via the LAN, the content of the channel bit CH contained in the updated information channel management information to all the terminals connected to the passive bus via which the notification has been received.

Figure 29:
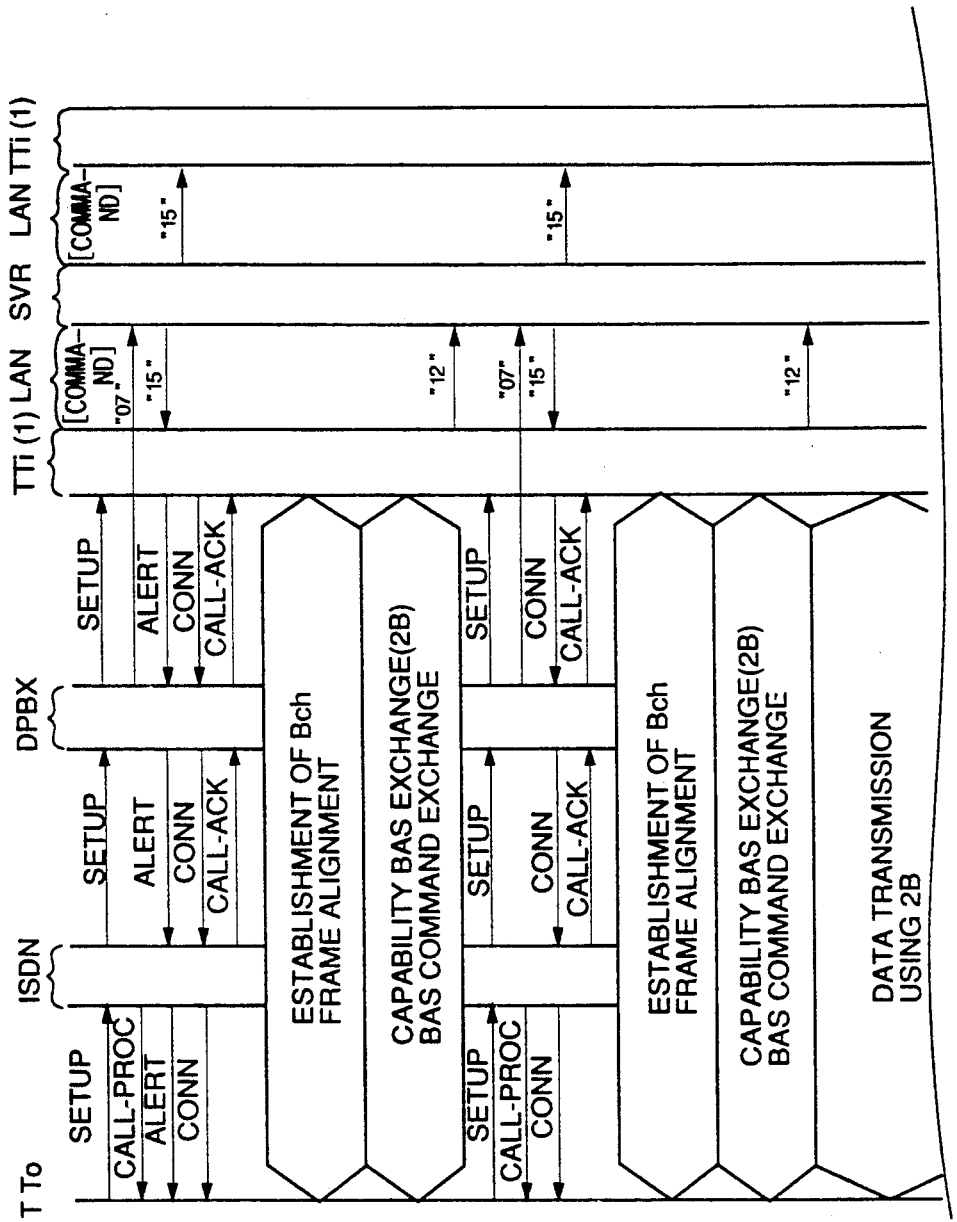
FIG. 29 is a time chart showing a data transfer sequence by video phone terminals in the communication system shown in FIG. 28.

FIG. 29 shows a sequence executed when video phone terminal TTo connected to another ISDN basic interface in the system shown in FIG. 28 calls the video phone terminal TTi(1), and audio data and dynamic image data are transferred between them using two information channels.

The video phone terminal TTo sends the call setup message SETUP to the ISDN in order to call the video phone terminal TTi(1). The ISDN sends the call setup message to the exchange DPBX, which sends the call setup message SETUP to the video phone terminal TTi(1). In the above manner, the call proceeding message CALL_PROC is set to the video phone terminal TTo from the ISDN.

In response to receipt of the call setup message SETUP, the video phone terminal TTi(1) changes to the calling state and starts to send the alerting message ALERT to the exchange DPBX. Thereafter, the predetermined call setup sequence is carried out between the video phone terminals TTi(1) and TTo via the exchange DPBX. In this manner, the information channel between these terminals is established.

The video phone terminal TTi(1) receives the call setup message SETUP, and then the exchange DPBX sends the network joint command (command "7") relating to the video phone terminal TTi(1) which receives the call setup message SETUP to the communication server SVR via the LAN.

The communication server SVR extracts the information channel management information relating to the video phone terminal TTi(1) in the above-mentioned manner. Then, the communication server SVR rewrites the channel bit CH relating to the informed information channel so that it shows data 1, and saves the updated information channel management information. Further, the communication server SVR sends the channel status notification command (command "15") to all terminals (that is, video phone terminals TTi(1) and TLi(1)) relating to the NT number contained in the updated information channel management information. In this manner, all the terminals are informed, via the LAN, of the content of the channel bit CH in the updated information channel management information.

The network joint command (command "7") has the following information. The communication server SVR data is set in the information element "called sub address". Data set in the exchange DPBX is set in the information element "calling sub address". Data 07h, which shows the "network joint" command, is set, as the command number, in the information element "command identifying information". The contents of the device number IDV are set in the information element "device number". The contents of the R_LSW number, the NT number and the TE number of the channel information SSC relating to the aforementioned video phone terminal TTi(1) are set in the information element "channel information". Further, data showing the information channel ensured is set in the CH number.

Data showing the logging time is set in the information element "logging generated time information". The values of the information elements "called number" and "calling number" relating to the call set up at the logging time are set in the information elements "called number" and "calling number", respectively. Valid data are not set in the information elements "reason display information", "BAS capability/command" and "transmission path quality".

The channel status notification command (command "15") from the communication server SVR is sent at a time immediately after the video phone terminal TTi(1) sends the connection message CONN. Thereby, the video phone terminal TTi(1) confirms that only one information channel is being used and another information channel can be ensured.

When the first information channel is established, the communication mode of the established first channel between the video phone terminals TT0 and TTi(1) is switched to the frame mode. Then, the frame alignment in the first channel is established. After this, the capability BAS and BAS command are exchanged, and hence the transmission mode to be used is determined.

Since two information channels can be used in the above case, the video phone terminal TTi(1) informs the other party that the video phone terminal TTi(1) has a data transfer capability of 2×64 Kbps. In this manner, the video phone terminal TTo recognizes that the video phone terminal TTi(1) has a data transfer capability of 2×64 Kbps.

The video phone terminal TTi(1) sends the capability notification command (command "12") to the communication server SVR via the LAND, and informs the communication server SVR of the content of the exchanged BAS. The communication server SVR updates the communication recording concerning the first channel of the video phone terminal TTi(1).

The video phone terminal TTo sends the call setup message SETUP to the video phone terminal TTi(1) in order to set up another call and hence establish the second information channel. In this manner, the call setup message SETUP for an additional call is sent to the video phone terminal TTi(1).

The exchange DPBX sends the network joint command (command "07") to the communication server SVR via the LAN in the same manner as has been described previously. The communication server SVR updates the information channel management information relating to the video phone terminal TTi(1), and sends the video phone terminal TTi(1) and the telephone terminal TLi the channel status notification command (command "15"). In this manner, these terminals are informed of the content of the updated information channel management information.

The second information channel is established between the video phone terminals TTo and TTi(1). The frame alignment in the second channel is established, and the first and second channels are synchronized with each other. Further, the capability BAS and BAS commands are exchanged between the terminals TTo and TTi(1), so that the setting of transmission mode is carried out. After this, the mode is switched to the mode using two information channels. In this state, audio data and dynamic image data are transferred using two information channels.

When the exchanging of the capability BAS is completed, the video phone terminal TTi(1) sends the capability BAS notification command (command "12") to the communication server SVR via the LAN. In response to receipt of this command, the communication server SVR updates the communication recording relating to the second channel of the video phone terminal TTi(1).

Thereafter, the same process as shown in FIG. 22 is executed. More specifically, communication between the video phone terminals TT0 and TTi(1) are terminated as follows. In order to terminate the data transmission, it is necessary to change the mode from the mode in which both the first and second channels are synchronized with each other to the mode in which only the first channel is used. For this requirement, the respective encoding rules of audio data and dynamic image data are set to systems most suitable for a transmission rate of 62.4 Kbps of the first channel, and the mode is changed to the transmission mode in which only the first channel is used. Simultaneously, the second channel is released from the state synchronized with the first channel, and the mode is switched to mode OF in which transmission of user data is idle. Thereby, the call is disconnected and released by the call disconnect/release procedure for the signal channel. In the first channel, the mode is changed from the mode in which audio and dynamic image data are transmitted to the mode OF in which only audio data is transmitted. After this, the call is disconnected and released in each of the first and second channels by the call disconnect and release procedure. In this manner, the data transmission operation is terminated. Regarding the video phone terminal TTi(1), the call disconnect and release procedure is carried between the video phone terminal TTi(1) and ISDN.

In the above call disconnect and release sequence, the exchange DPBX sends the network joint command (command "07") to the communication server XVR via the LAN when one information channel has been released. In response to receipt of this command, the communication server SVR extracts the information channel management information relating to the video phone terminal TTi(1). In this case, zero has been set in the next call state number, and hence the value of the channel bit CH relating to the specified information channel is updated so that it shows zero. Then, the communication server SVR sends the channel status notification command (command "15") to the video phone terminal TTi(1) via the LAN. In this manner, the video phone terminal TTi(1) and the telephone terminal TLi are informed of the content of the channel bit contained in the updated information channel management information.

As described above, the exchange DPBX of the above embodiment of the present invention has the function of making a connection with the LAN. Hence, it is not necessary to provide the terminals with the function of sending the logging command or the logging and channel status request command and thus to reduce the cost of the whole communication system.

In the embodiment as described above, the exchange DPBX and the communication server SVR are connected to each other via the LAN. Alternatively, it is possible to replace this structure with another simplified means, such as a serial transmission path.

Figure 30:
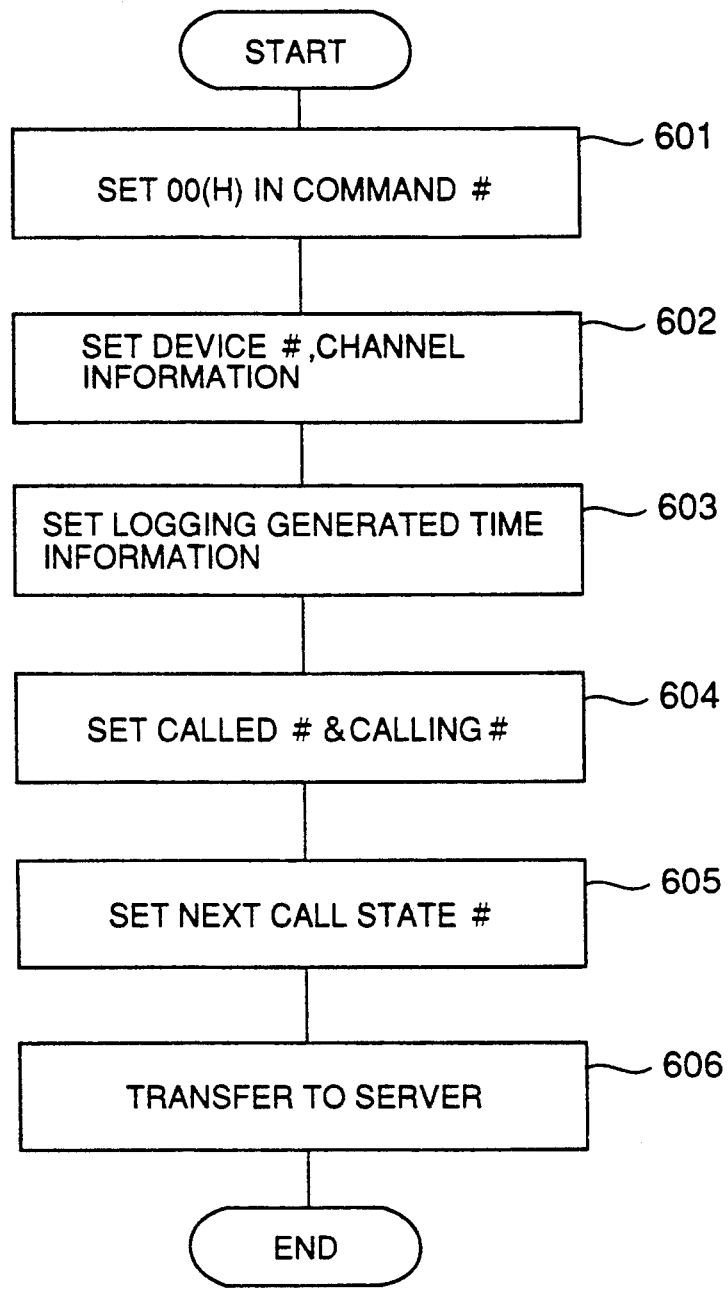
FIG. 30 is a flowchart of a sequence for processing a network joint command executed by a digital private branch exchange.
Figure 27:
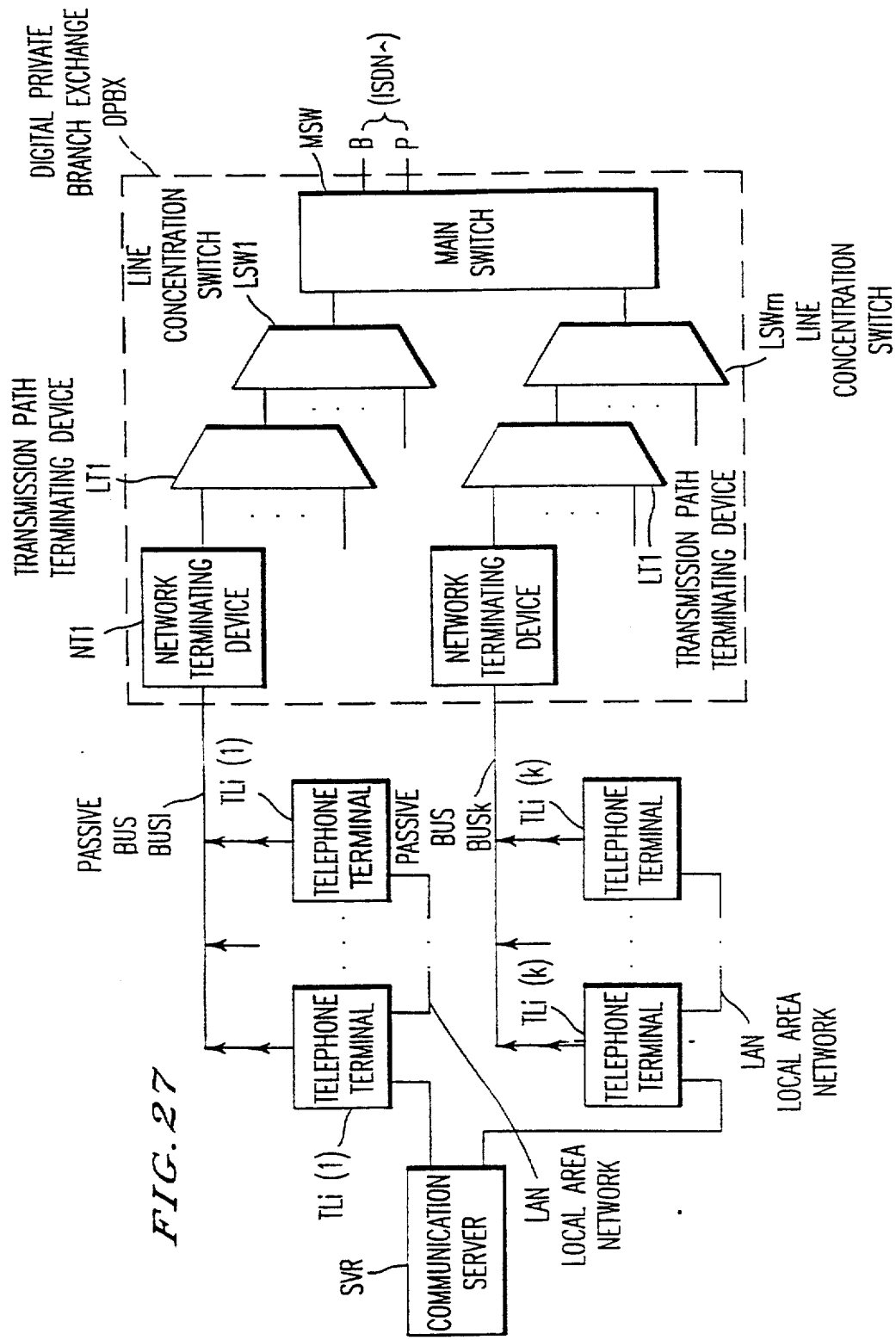
Figure 28:
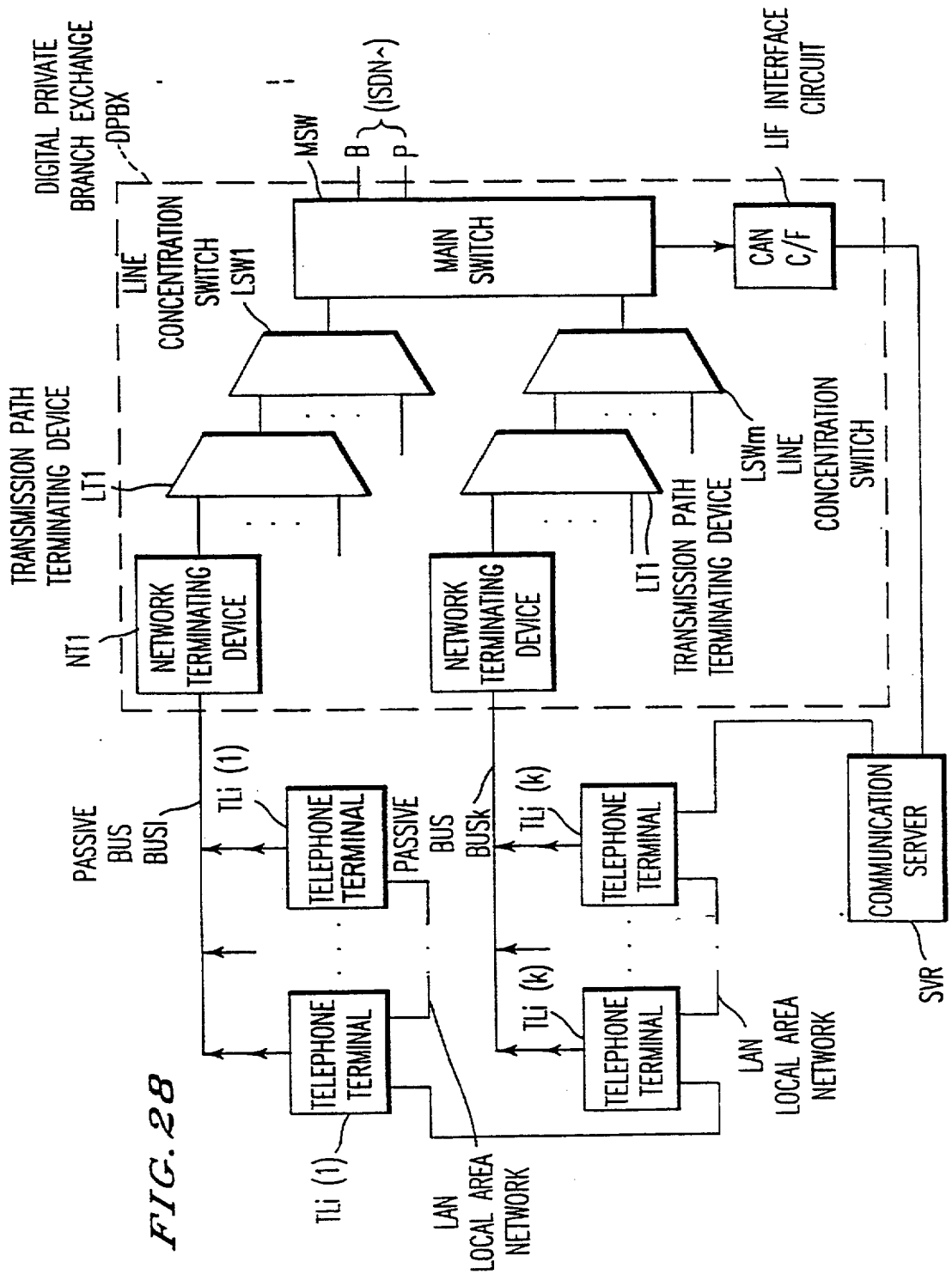

FIG. 30 shows an example of the network joint command executed by the exchange DPBX, as the channel use state notification process and the channel release state notification process. At step 601, the data 07h, which shows the "logging" command is set in the information element "command identifying information". At step 602, the content of the device number IDV of the terminal in which the call state has been changed is set in the "device number" information element. Further, the contents of the R_LSW number, the NT number and the TE number of the channel information SSC of the terminal in which the call state has been changed, and data showing the information channel allocated to the terminal being considered are set in the information element "channel information".

At step 603, data showing the logging time is set in the information element "logging generated time information". At step 604, the values of the information elements "called number" and "calling number" relating to the call set up at the logging time are set in the information elements "called number" and "calling number", respectively. At step 605, the value of the call state number relating to the call state to be next shifted is set in the information element "call state number".

Data relating to the communication server SVR is set in the information element "called sub address". Data set in the exchange DPBX is set in the information element "calling sub address". Valid data are not set in the information elements "reason display information", "BAS capability/command" and "transmission path quality". In this state, at step 606, the data transfer process for transferring data to the LAN is activated in the state where the necessary information has been sent. In the above mentioned manner, the network joint command is sent to the communication server SVR.

The present invention includes a case where the video phone terminals TTi and TTi(1) - TTi(k) and the telephone terminals TLi and TLi(k) generate calls. In this case, it is necessary to include identification information showing whether the video phone terminals TTi and TTi(1) - TTi(k) and the telephone terminals TLi and TLi(k) should call-out operation or call-in operation. Further, in order to have the data communication operation of audio/visual terminals (video phone terminals TTi and TTi(1) - TTi(k)) give priority over other terminals, the following process is executed.

When an audio/visual terminal shifts to the communication state in the state where two information channels are available, data "11" is set in the reserve bits CHa of the corresponding passive buses BUS, and BUS(1) - BUS(k). When the channel status request notification command is sent in response to the logging and channel status request command or the channel status request command, the contents of the reserve bits CHa is handled as data showing the CH number to be set in the information element "channel information" with respect to the non-audio/visual terminals TLi and TLi(1) - TLi(k). In this manner, data communication of non-audio/visual terminals are inhibited while audio/visual terminals are executing data communication. However, when the non-audio/visual terminals execute the call-in operation, this operation takes priority to other processes, and hence calls from the calling terminals are accepted.

The present invention includes a configuration having a digital private branch exchange other than the exchange DPBX specifically disclosed in the specification and drawings.

According to the present invention, the communication server respectively informs ISDN terminals of the status of use of information channels of passive buses to which the ISDN terminals are respectively connected. Hence, each ISDN terminal can identify the number of usable information channels and hence avoid the additional call setup operation by trial and error and suppress an increase of invalid calls. Further, each audio/visual terminal switches to the communication mode using the second information channel immediately after the second information channel has become available. Thus, the performance of the audio/visual terminals can be improved.

It will be noted that the hardware structure of each structural elements can be formed with a conventional hardware structure.

The present invention is not limited to the specifically disclosed embodiments, and variations and modifications may be made without departing from the scope of the present invention.

What is claimed is:

1. A method for controlling ISDN terminals connected to a passive bus conforming to an ISDN basic interface, said ISDN terminals being coupled to each other via a network, said method comprising the steps of:
   a) managing status of use of information channels in the passive bus by means of a communication server connected to the network;
   b) sending the communication server command data showing that the ISDN terminals will use the information channels;
   c) updating management data showing the status of use of the information channels managed in step a) in response to receipt of the command data; and
   d) sending updated management data showing the status of use of the information channels obtained after the command data is received to the ISDN terminals via the network.

2. A method as claimed in claim 1, wherein said method further comprises the step of:
   e) detecting, by each of the ISDN terminals, a number of usable information channels in accordance with the updated management data.

3. A method as claimed in claim 1, wherein said method further comprises the steps of:
   e) determining, in accordance with the updated management data, whether or not another information channel is available in a state where the ISDN terminals are respectively using one of the information channels; and
   f) changing a communication mode from a first mode in which data is transferred via one of the information channels to a second mode in which data is transferred via two of the information channels.

4. A method as claimed in claim 1, wherein said step b) sends the communication server command data immediately before the ISDN terminals respectively change from an idle state having no call.

5. A method for controlling ISDN terminals connected to passive buses conforming to an ISDN basic interface, said passive buses being provided on an internal side of an exchange, a plurality of lines conforming to the ISDN basic interface or a primary rate interface being connected to an external side thereof, each of said ISDN terminals being coupled to one of a plurality of local area networks, said method comprising the steps of:
   a) managing, in each of the passive buses, status of use of information channels in each of the passive buses by means of a communication server connected to the local area networks;
   b) sending, from the ISDN terminals, communication server command data showing that the ISDN terminals will use the information channels;
   c) updating, in each of the passive buses, management data showing a status of use of the information channels managed by said step a) in response to receipt of the command data; and
   d) sending, in each of the passive buses, updated management data showing, in each of the passive buses, a status of use of the information channels obtained after the command data is received to the ISDN terminals via the local area networks.

6. A method as claimed in claim 5, wherein said method further comprises the step of:
   e) detecting, by each of the ISDN terminals, a number of usable information channels in accordance with the updated management data.

7. A method as claimed in claim 5, wherein said method further comprises the steps of:
   e) determining, in each of the passive buses on the basis of the updated management data, whether or not another information channel is available in a state where the ISDN terminals are respectively using one of the information channels; and
   f) changing a communication mode from a first mode in which data is transferred via one of the information channels to a second mode in which data is transferred via two of the information channels.

8. A method as claimed in claim 5, wherein said step b) sends the communication server command data immediately before the ISDN terminals respectively change from an idle state having no call.

9. A method for controlling ISDN terminals connected to passive buses conforming to an ISDN basic interface, said passive buses being provided on an internal side of an exchange, a plurality of lines conforming to the ISDN basic interface or a primary rate interface being connected to an external side thereof, each of said ISDN terminals and said exchange being coupled to one of a plurality of local area networks, said method comprising the steps of:
   a) managing, in each of the passive buses, status of use of information channels in each of the passive buses by means of a communication server connected to the local area networks;
   b) sending, from said exchange, communication server command data showing that the ISDN terminals will use the information channels;
   c) updating, in each of the passive buses, management data showing the status of use of the information channels managed by said step a) in response to receipt of the command data; and
   d) sending, in each of the passive buses, updated management data showing, in each of the passive buses, the status of use of the information channels obtained after the command data is received to the ISDN terminals via the local area networks.

10. A method as claimed in claim 9, wherein said method further comprises the step of:
    e) detecting, by each of the ISDN terminals, a number of usable information channels in accordance with the updated management data.

11. A method as claimed in claim 9, wherein said method further comprises the steps of:
    e) determining, in each of the passive buses in accordance with the updated management data, whether or not another information channel is available in a state where the ISDN terminals are respectively using one of the information channels; and
    f) changing a communication mode from a first mode in which data is transferred via one of the information channels to a second mode in which data is transferred via two of the information channels.

12. A method as claimed in claim 9, wherein said step b) sends the communication server command data immediately before the ISDN terminals respectively change from an idle state having no call.

13. An ISDN system comprising:
    a plurality of ISDN terminals;

a passive bus which conforms to an ISDN basic interface, said ISDN terminals being connected to said passive bus;

a local area network coupling said ISDN terminals to each other; and a communication server coupled to said local area network, said communication server comprising:

first means for managing status of use of information channels in the passive bus;

second means, operatively coupled to said first means, for updating management data showing the status of use of the information channels in response to receipt of a command data showing that the ISDN terminals will use the information channels; and third means, operatively coupled to said first and second means, for sending updated management data showing the status of use of the information channels obtained after the command data is received to the ISDN terminals via the local area network.

14. An ISDN system as claimed in claim 13, wherein each of the ISDN terminals comprises fourth means for detecting a number of usable information channels in accordance with the updated management data.

15. An ISDN system as claimed in claim 13, wherein each of said ISDN terminals comprises:

fourth means for determining, in accordance with the updated management data, whether or not another information channel is available in a state where the ISDN terminals are respectively using one of the information channels; and fifth means, operatively coupled to said fourth means, for changing a communication mode from a first mode in which data is transferred via one of the information channels to a second mode in which data is transferred via two of the information channels.

* * * * *

UNITED STATES PATENT AND TRADEMARK OFFICE
CERTIFICATE OF CORRECTION

PATENT NO. : 5,268,904
DATED : December 7, 1993
INVENTOR(S) : Toshihiko Umeda et al It is certified that error appears in the above-indentified patent and that said Letters Patent is hereby corrected as shown below:

On the title page, "15 Claims, 26 Drawing Sheets" should read
--15 Claims, 27 Drawing Sheets--.

The drawing sheets, consisting of Figures 27 and 28, should be deleted to be replaced with the drawings sheets, consisting of Figures 27 and 28, as shown on the attached pages.

Figure 1A:
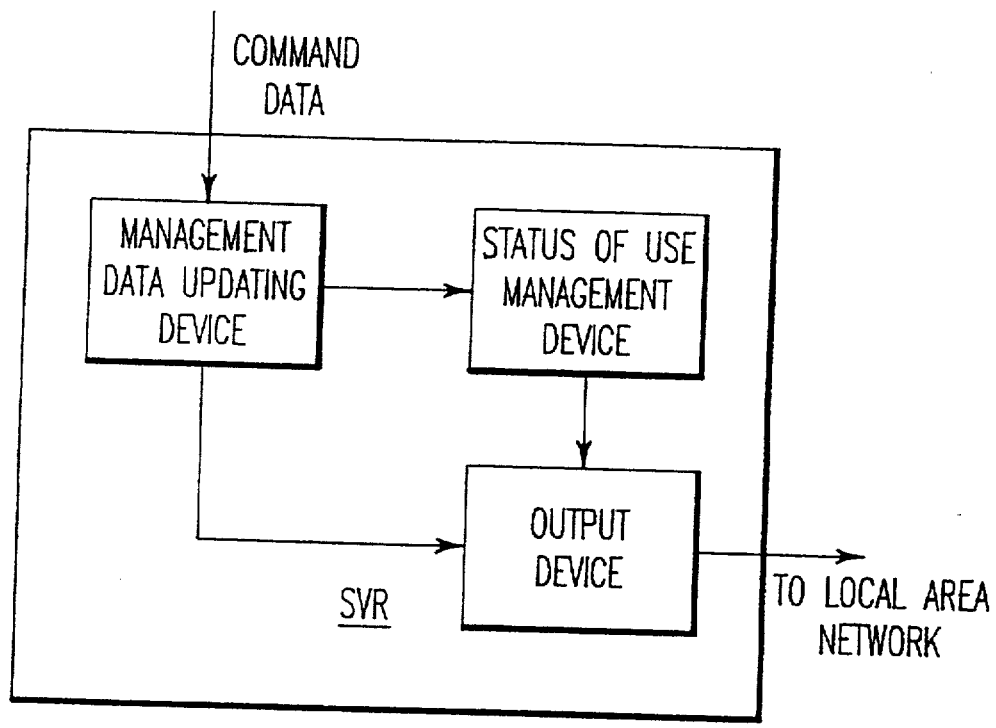
FIG. 1A is a diagram showing the components of the communication server SVR for managing status of use of the information channels of the passive bus, the management data updating device, and an output device for sending updated management data to the ISDN terminals of the system.

The drawing sheet consisting of Figure 1A, should be added as shown on the attached page.

Signed and Sealed this

Ninth Day of August, 1994

Attest:

BRUCE LEHMAN

Attesting Officer        Commissioner of Patents and Trademarks